United States Patent [19]

Sawada

[11] Patent Number: 4,503,137

[45] Date of Patent: Mar. 5, 1985

[54] IMAGE-FORMING PROCESS

[75] Inventor: Satoru Sawada, Kanagawa, Japan

[73] Assignee: Fuji Photo Film Co., Ltd., Kanagawa, Japan

[21] Appl. No.: 580,923

[22] Filed: Feb. 16, 1984

[30] Foreign Application Priority Data

Feb. 18, 1983 [JP] Japan .................................. 58-26008

[51] Int. Cl.³ .......................... G03C 1/40; G03C 5/54

[52] U.S. Cl. .................................... 430/203; 430/222; 430/351; 430/559

[58] Field of Search ............... 430/203, 222, 223, 351, 430/559

[56] References Cited

U.S. PATENT DOCUMENTS

| | | | |
|---|---|---|---|
| 3,980,479 | 9/1976 | Fields et al. | 430/222 |
| 4,139,379 | 2/1979 | Chasman et al. | 430/223 |
| 4,139,389 | 2/1979 | Hinshaw et al. | 430/223 |
| 4,232,107 | 11/1980 | Janssens | 430/223 |
| 4,430,415 | 2/1984 | Aono et al. | 430/203 |
| 4,439,513 | 3/1984 | Sato et al. | 430/203 |

*Primary Examiner*—Richard L. Schilling
*Attorney, Agent, or Firm*—Sughrue, Mion, Zinn, Macpeak, and Seas

[57] ABSTRACT

A process for imagewise forming a mobile dye, which comprises heating, after or simultaneously with image exposure, a light-sensitive material having on a support a photosensitive silver halide, a binder, and an immobile dye-providing material which releases a dye by heating, and which is reductive and by heating becomes a material not releasing a dye by causing an oxidation with the photosensitive silver halide at a portion where a silver halide is reduced to form silver.

18 Claims, No Drawings

IMAGE-FORMING PROCESS

FIELD OF THE INVENTION

This invention relates to a novel process for forming a dye image by heating.

The invention further relates to a novel light-sensitive photographic material containing an immobile dye-providing material which releases a dye by heating but becomes a material not releasing a dye by causing a reaction with a photosensitive silver halide and/or an organic silver salt oxidizing agent by heating, that is, becomes a material not releasing a hydrophilic dye when the immobile dye-providing material is oxidized at a portion where a silver image is formed.

Furthermore, the invention relates to a novel process of obtaining a dye image by transferring a dye released by heating into a dye-fixing layer.

BACKGROUND OF THE INVENTION

Since a photographic process using silver halide is excellent in photographic properties such as sensitivity and gradation control as compared to other photographic processes such as electrophotography and a diazo photographic process, the silver halide photographic process has hitherto been most widely used. Recently, a technique capable of more easily and rapidly obtaining images has been developed by changing an image-forming process of a silver halide photographic material from a conventional wet process such as a process which uses a liquid developer to a dry process such as a developing process which uses heating.

Heat developable photographic materials are known in this art and the heat developable materials and image-forming processes using these heat developable materials are described in, for example, "Shashin Kogaku no Kiso (The Basis of Photographic Engineering)", pages 553-555, published by Corona K.K. in 1979; Eizo Jooho (Image Information)", page 40, published in April, 1978; "Nebletts Handbook of Photography and Reprography", 7th Ed., pages 32-33, (Van Nostrand Reinhold Company); U.S. Pat. Nos. 3,152,904; 3,301,678; 3,392,020; 3,457,075; U.S. Pat. Nos. 1,131,108 and 1,167,777; and "Research Disclosure" (RD-17029), pages 9-15, June 1978.

Various processes have been proposed for obtaining dye images by a dry system. For example, for forming color images by a combination of the oxidation product of a developing agent and a coupler, there is proposed a combination of a p-phenylenediamine reducing agent and a phenolic or active methylene coupler in U.S. Pat. No. 3,531,286; p-aminophenol series reducing agents in U.S. Pat. No. 3,761,270; p-aminophenol series reducing agents in Belgian Pat. No. 802,519 and sulphonamidophenol series reducing agents in "Research Disclosure", pages 31-32; September, 1975; and a combination of a sulfonamidophenol series reducing agent and a 4-equivalent coupler in U.S. Pat. No. 4,021,240.

However, in these processes there is a fault that color images become turbid since images of reducing silver and color images are simultaneously formed at light exposed areas after heat development. For overcoming the fault, there are proposed a process of removing the silver images by liquid processing and a process of transferring the dyes only to another layer, for example, a sheet having an image-receiving layer. However, there remains a fault that it is not easy to discriminate a dye from the reaction mixture and transfer the dye by itself.

Also, a process of introducing a nitrogen-containing heterocyclic ring group into a dye, forming a silver salt, and liberating the dye by heat development is described in "Research Disclosure", (RD-16966), pages 54-58, May 1978. However, in the process it is difficult to control the liberation of the dye at non-exposed areas, whereby a clear image cannot be obtained and hence the foregoing process is unsuitable for general use.

Furthermore, a process of forming color images by utilizing leuco dyes is described in, for example, U.S. Pat. Nos. 3,985,565 and 4,022,617. However, in the process it is difficult to stably incorporate leuco dyes in photographic materials, that is, the photographic materials containing leuco dyes are gradually colored when they are preserved.

Also, for forming a positive color image by a heat sensitive silver dye bleaching process, there are described useful dye bleaching processes in "Research Disclosure", (RD-14433), pages 30-32, April 1976; ibid., (RD-15227), pages 14-15, December 1976; U.S. Pat. No. 4,235,957, etc.

However, these processes have such faults that additional steps and material are required for accelerating the bleaching of dye, for example, it is required to superpose an activating agent sheet on the light-sensitive material and heat the assembly, and also color images obtained are gradually bleached by reduction with free silver, etc., existing in the light-sensitive material during the preservation of the images for a long period of time.

SUMMARY OF THE INVENTION

An object of this invention is to overcome the foregoing difficulties in the conventional light-sensitive photographic materials and to provide a novel process for forming dye images negative to silver images by heating a photosensitive material.

Another object of this invention is to provide a novel image-forming process for obtaining a dye image by transferring a mobile dye released by heating into a dye-fixing layer.

A further object of this invention is to provide a novel light-sensitive photographic material containing a dye-providing material which releases a mobile dye a non-silver image forming areas by heating but becomes a material not releasing dye by causing a reaction with a light-sensitive silver halide and/or an organic silver salt oxidizing agent at silver image forming areas.

Another object of this invention is to provide a process of obtaining a clear image by a simple manner.

The foregoing objects of this invention can be attained by the process of this invention. That is, according to this invention, there is provided a image-forming process of imagewise forming a mobile dye by heating after image-exposure or simultaneously with image-exposure a light-sensitive photographic material having on a support at least a light-sensitive silver halide, a binder, an immobile dye-providing material (hereinafter, simply referred to as a dye-providing material), which releases a dye by heating, and which is reductive and by heating becomes a material not releasing a dye by causing an oxidation reaction with the light-sensitive silver halide at a portion where the silver halide is reduced to silver.

PREFERRED EMBODIMENTS OF THE INVENTION

When a negative type silver halide light-sensitive material containing the above-described dye-providing material is imagewise exposed and developed by heating, an oxidation-reduction reaction occurs between the light-sensitive silver halide and/or the organic silver salt oxidizing agent and th immobile dye-providing material under the presence of the exposed light-sensitive silver halide as a catalyst, whereby a silver image is formed at the exposed areas. In the heating step, at the exposed areas the immobile dye-providing material is converted into the oxidation product thereof, whereby the dye is not released, while the mobile dye is obtained at the non-exposed areas. In this case the existence of a dye-releasing activator can accelerate the foregoing reaction. By transferring the mobile dye into, for example, a dye-fixing layer, a positive dye image is obtained.

The foregoing explanation relates to using a negative type silver halide emulsion and the mechanism using an auto positive silver halide emulsion is the same as when using the negative silver halide emulsion except that a silver image is obtained at the non-exposed areas and the mobile dye is obtained at the exposed areas.

A primary feature of this invention is that the oxidation reduction reaction with a light-sensitive silver halide and the dye-releasing reaction in this invention occurs in a substantially water free dry state at high temperature. The term "high temperature" in this invention means a temperature condition of at least 80° C. and the term "a substantially water free dry state" means a state where the system is in an equilibrium state with moisture in the air and is not supplied with water from outside the system. Such a state is described in "The Theory of the Photographic Process", 4th Ed., editted by T. H. James, Macmillan. That a sufficient reactivity is obtained even in a substantially water free state can also be confirmed by the fact that the reactivity of the sample of this invention dried for one hour at a pressure of $10^{-3}$ mm Hg is not reduced.

Prior hereto, it has been considered that a dye-releasing reaction is caused by the attack of a so-called nucleophilic reagent and the reaction is usually performed in a liquid having a pH higher than 10. Therefore, it is beyond expectation that the dye-releasing reaction in this invention shows a high reactivity at high temperature and in a substantially water free state.

Examples of the dye-providing materials used in this invention include compounds shown by general formula (IA) or (IB);

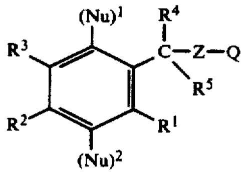

(IA)

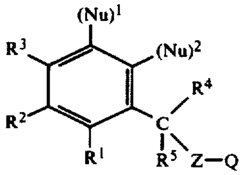

(IB)

wherein $(Nu)^1$ and $(Nu)_2$ each represents a nucleophilic group (e.g., —OH group, NH— group, etc.); Z represents a divalent atomic group (e.g., a sulfonyl group) which is electrically negative to the carbon atom to which $R^4$ and $R^5$ are substituted; Q represents a dye moiety; $R^1$, $R^2$ and $R^3$ each represents a hydrogen atom, a halogen atom such as Cl, Br, F and I, an alkyl group, an alkoxy group, or an acylamino group; when said $R^1$ and $R^2$ are in an adjacent position to each other on the ring, they may form a condensed ring with the residue of the molecule; said $R^2$ and $R^3$ may form a condensed ring with the residue of the molecule; and $R^4$ and $R^5$, which may be the same or different, each represents a hydrogen atom, a hydrocarbon group, or a substituted hydrocarbon group. The alkyl moiety in these groups may have 1 to 32 carbon atoms. At least one of said $R^1$, $R^2$, $R^3$, $R^4$ and $R^5$ contains a so-called non-diffusible group, i.e., a group having a sufficient size for making the foregoing compound immobile in the layer.

The residue giving non-diffusible property is a residue which makes the compound of this invention capable of mixing with a hydrophilic colloid conventionally used for photographic materials in a non-diffusible form. In general, an organic residue capable of carrying a straight or branched chain aliphatic group or a homocyclic, heterocyclic, or aromatic group having 8 to 20 carbon atoms, is preferably used for the purpose. Such a residue is bonded to the remaining moiety of the molecule represented by general formula (IA) and (IB) directly or indirectly through, for example, —NHCO—, —$NHSO_2$—, —NR— (wherein R represents a hydrogen atom or an alkyl group), —O—, —S—, or —$SO_2$—. The residue giving a non-diffusible property to the compound may further carry a group giving solubility in water, e.g., a sulfo group or a carboxy group (the group may be in the form of an anion). Since the non-diffusible property or diffusible property of a compound is determined by the size of the whole molecule of the compound, when, for example, the whole size of the molecule is sufficiently large, a group having a shorter chain length may be used as the group giving a non-diffusible property to the compound.

Processes of preparing these compounds are described in German Patent Application (Offenlegungsschrift) No. 2,654,213.

Other examples of the dye-providing material used in this invention include compounds shown by the following general formula (II):

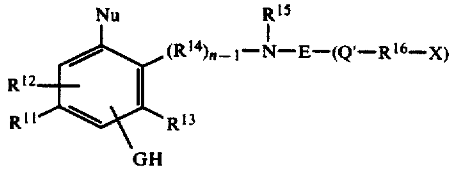

(II)

wherein Nu represents a nucleophilic group (e.g., —$NH_2$ group or —OH group); GH represents an oxidizable group (e.g., an amino group (including an alkylamino group) or a sulfonamido group); said GH may be a cyclic group formed together with $R^{11}$ and $R^{13}$ or a nucleophilic group (e.g., —$NH_2$ group or OH group) and is preferably positioned in the para-position to Nu in the foregoing formula; E represents an electrophilic group, which may be a carbonyl group (—CO—) or a thiocarbonyl group (—CS—) and is preferably a carbonyl group; Q' is a group providing a monoatomic bonding between E and $R^{16}$, wherein the monoatom is a nonmetallic atom belonging to group Va or VIa of the periodic table in a -2 or -3 valence state, such as, for example, a nitrogen atom, oxygen atom, sulfur atom, and selenium atom, wherein said atom provides two covalent bonds for bonding E to $R^{16}$ and when Q' is a trivalent atom, it is substituted with a hydrogen atom, an alkyl group (having 1 to 10 carbon atoms and including a substituted alkyl group), or an aromatic group (having 5 to 20 carbon atoms and including an aryl group and a substituted aryl group), or Q' is an atomic group necessary for forming a 5- to 7-membered ring together with $R^{16}$ (e.g., a pyridine group or a piperidine group); $R^{14}$ is an alkylene group having 1 to 3 carbon atoms which group may be substituted with an alkyl group, an aryl group or an oxo group, or an alkylene group of which at least one methylene group is substituted with an alkyl or aryl group and is preferably a methylene group or alkyl-substituted or aryl-substituted methylene group; n is 1 or 2; $R^{16}$ may be an aromatic group having at least 5 carbon atoms, preferably 5 to 20 carbon atoms, including a heterocyclic group, e.g., a group having a nucleus such as pyridine, tetrazole, benzimidazole, benztriazole, or isoquinoline or an arylene group having 6 to 20 carbon atoms (preferably, a phenylene group, a naphthylene group, a substituted phenylene group or a substituted naphthylene group); said $R^{16}$ may be an aliphatic hydrocarbon group such as an alkylene group having 1 to 12 carbon atoms, including a substituted alkylene group; $R^{15}$ may be an alkyl group having 1 to 40 carbon atoms (including a substituted alkyl group and a cycloalkyl group) or an aryl group having 6 to 40 carbon atoms (including a substituted aryl group), said group may function as a ballast group; $R^{11}$, $R^{12}$ and $R^{13}$ each may be a hydrogen atom or a monoatomic substituent such as a halogen atom but is preferably a polyatomic substituent such as an alkyl group having 1 to 40 carbon atoms (including a substituted alkyl group and a cycloalkyl group), an alkoxy group having 1 to 40 carbon atoms, an aryl group having 6 to 40 carbon atoms (including a substituted aryl group), an alkylcarbonyl group, an aryl carbonyl group, a sulfamoyl group, and a sulfonamido group; said $R^{11}$ and $R^{13}$ must, however, be the polyatomic substituent when $R^{16}$ is an aliphatic hydrocarbon group such as an alkylene group and said $R^{12}$ is preferably a polyatomic substituent; and $R^{14}$ is selected to provide a substantial proximity of the nucleophilic group to E to permit the occurrence of an intramolecular nucleophilic reaction accompanied by the release of Q' from E and is, preferably, selected to provide 3 to 5 atoms between the atom which is the nucleophilic center of the foregoing nucleophilic group and the atom which is the electrophilic center of the foregoing electrophilic group, whereby the foregoing compound can form a 5- to 8-membered ring, most preferably 5- to 6-membered ring by an intramolecular nucleophilic substitution of group $-(Q-R^{16}-X)$ from the foregoing electrophilic group. X is a dye moiety.

When $R^{15}$ of the foregoing compound shown by general formula (II) is a bulky group giving steric hindrance, the compound of the general formula shows totally improved image-forming characteristics having improved Dmin (minimum density) and improved stability after processing. Typical examples of the useful bulky group which can be employed as $R^{15}$ are cyclohexyl, isopropyl, isobutyl, and benzyl.

When $R^{11}$, $R^{12}$ and $R^{13}$ include a bulky substituent capable of giving steric hindrance to the adjacent portion to the benzene ring, the image-forming characteristics are improved. Typical examples of the substituent are α-substituted or β-substituted alkyl groups such as an α-methylalkyl group, a cyclohexyl group, an isopropyl group, an α-methylbenzyl group, and a p-t-butylphenethyl group. It is considered to be useful that the bulky substituent be in the compound of the foregoing structure.

The dye moiety contained in the compound of this invention is derived from a hydrophilic dye or hydrophobic dye. It is preferably derived from a hydrophilic dye such as an azo dye, an azomethine dye, anthraquinone dye, a naphthoquinone dye, a styryl dye, a nitro dye, a quinoline dye, a carbonyl dye, a phthalocyanine dye and a metal complex salts of them.

The dye precursor represented by the general formula (I) or (II) is typically a compound giving a dye by hydrolysis and examples of the dye precursor are acylated promotors of dyes (temporary short wave-type dye) as described in, for example, Japanese Patent Application (OPI) No. 125,818/'73 and U.S. Pat. Nos. 3,222,196 and 3,307,947. By temporarily shifting the absorption wave length of the dye to a short wave side by acylation until at least exposure the occurrence of desensitization based on the absorption of light by the color image-forming agent in the light-sensitive silver halide emulsion can be prevented. In addition, a dye showing a different hue between the case of being transferred onto a mordanting layer and the case of existing in a silver halide emulsion layer can be utilized. In addition, the dye moiety can have a group imparting water-solubility, such as a carboxy group and a sulfoamido group.

In the present invention it is necessary that the immobile dye-providing material is immobilized in a hydrophilic or hydrophobic binder and only the released dye has mobility. It is preferable that the dye-providing material is quickly oxidized by a silver halide and/or an organic silver salt oxidizing agent to efficiently release a mobile dye for forming an image by the action of the dye-releasing activator.

Furthermore, it is preferable that the dye-providing material can be easily prepared.

Examples of the dyes utilized as the image-forming dyes in this invention are azo dyes, azomethine dyes, anthraquinone dyes, naphthoquinone dyes, styryl dyes, nitro dyes, quinoline dyes, carbonyl dyes, phthalocyanine dyes, etc., and typical examples of these dyes are shown below by color distinction. These dyes can be used in a form such that the absorption is temporarily shifted to a short wave length side, which can be recolored during development.

Yellow

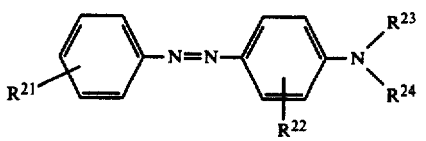

-continued
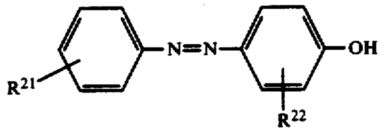
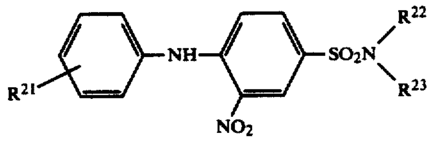
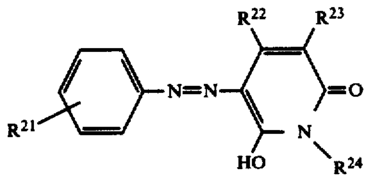
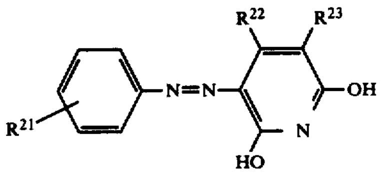
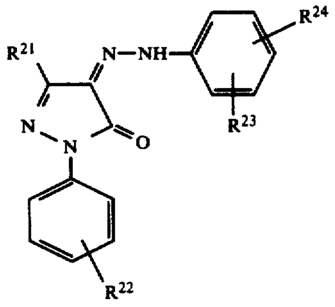
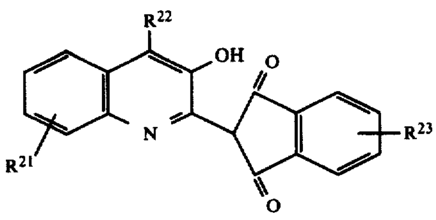
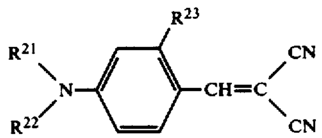
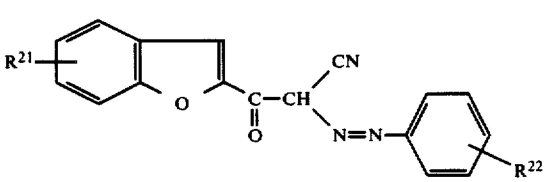
-continued
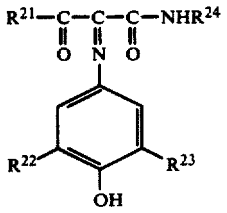
Magenta
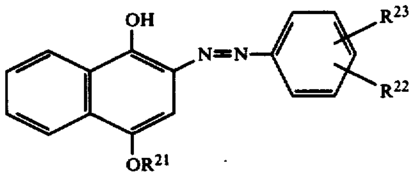
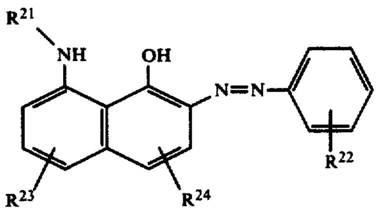
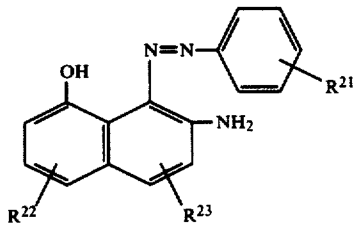
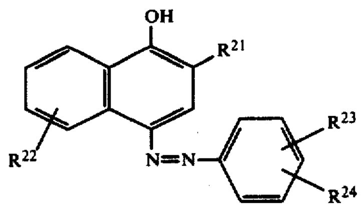
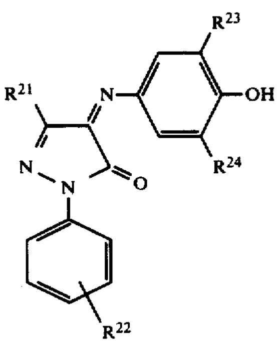

-continued
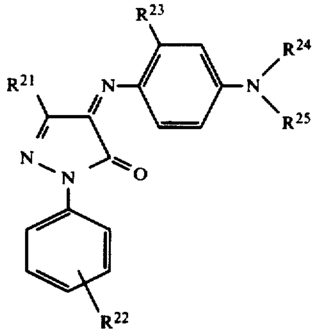
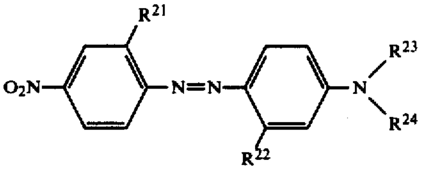
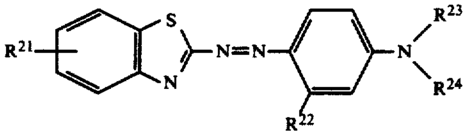
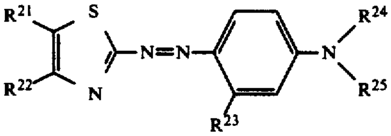
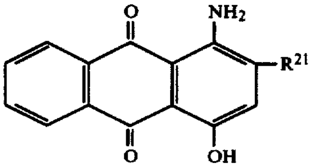
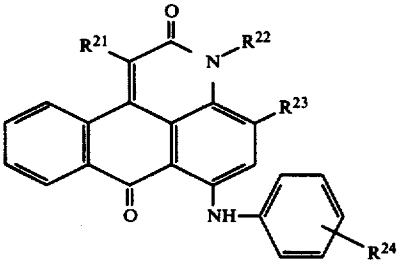
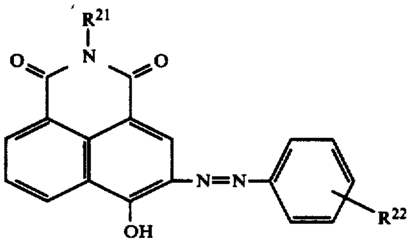
Cyan
-continued
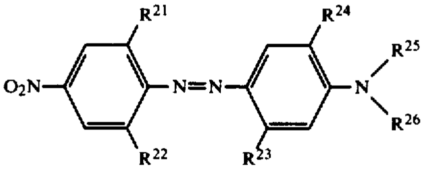
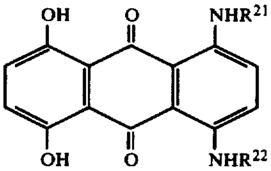
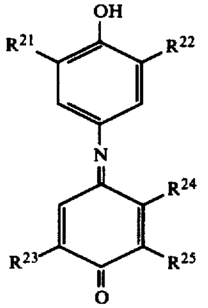
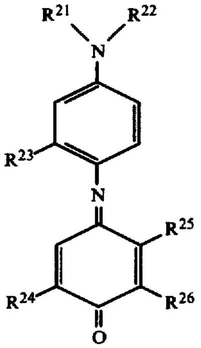
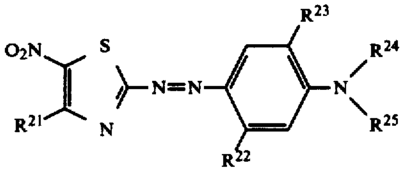
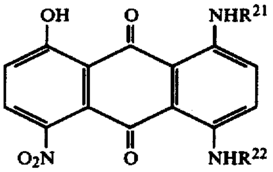
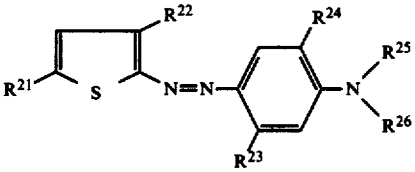
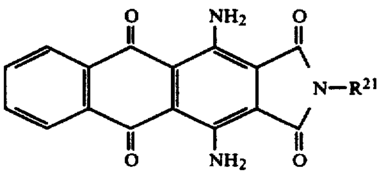

-continued

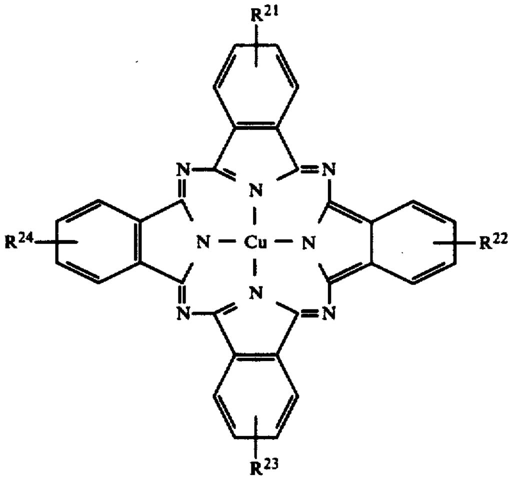

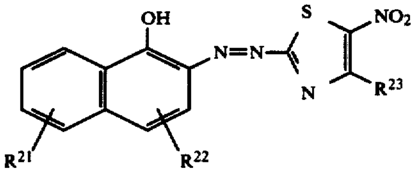

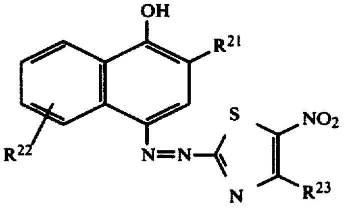

-continued

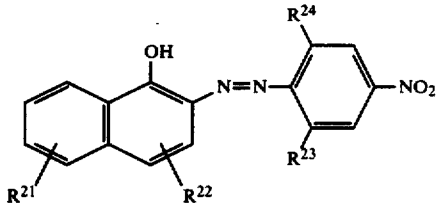

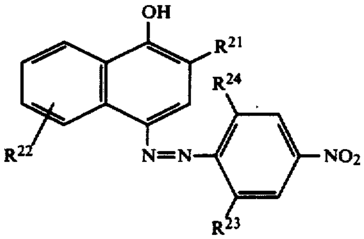

In the foregoing formulae, $R^{21}$ to $R^{26}$ each represents a hydrogen atom, an alkyl group, a cycloalkyl group, an aralkyl group, an alkoxy group, an aryloxy group, an aryl group, an acylamino group, an acyl group, a cyano group, a hydroxy group, an alkylsulfonylamino group, an arylsulfonylamino group, an alkylsulfonyl group, a hydroxyalkyl group, a cyanoalkyl group, an alkoxycarbonylalkyl group, an alkoxyalkyl group, an aryloxyalkyl group, a nitro group, a halogen atom, a sulfamoyl group, an N-substituted sulfamoyl group, a carbamoyl group, an N-substituted carbamoyl group, an acyloxyalkyl group, an amino group, a substituted amino group, an alkylthio group, or an arylthio group. Among these substituents, the alkyl group and aryl group may further be substituted with a halogen atom, a hydroxy group, a cyano group, an acyl group, an acylamino group, an alkoxy group, a carbamoyl group, a substituted carbamoyl group, a sulfamoyl group, a substituted sulfamoyl group, a carboxy group, an alkylsulfonamino group, an arylsulfonylamino group, or a ureido group.

Practical examples of compounds of this invention shown by general formula (IA) or (IB) are as follows.

| | | Color of the dye released |
|---|---|---|
| (1) | 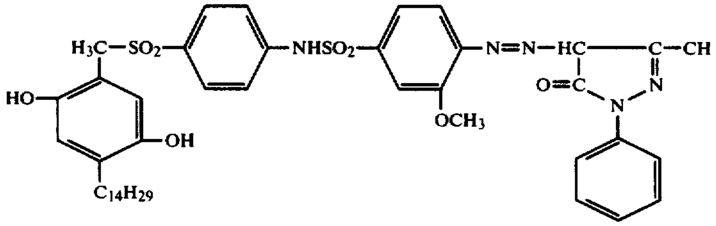 | Yellow |

-continued
(2)
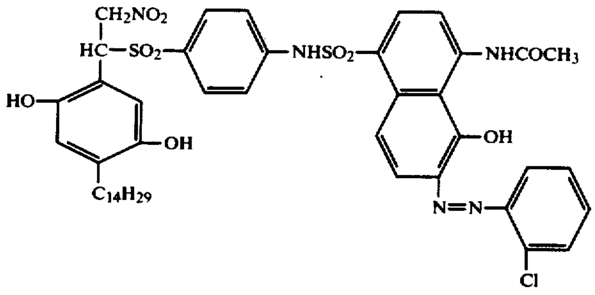
Magenta
(3)
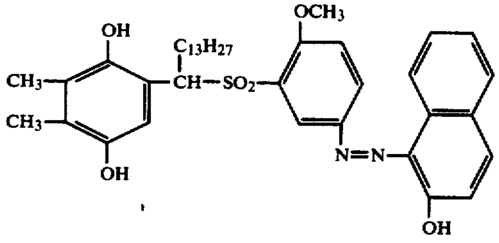
Magenta
(4)
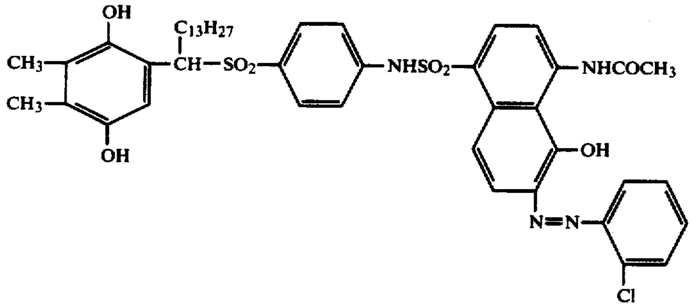
Magenta
(5)
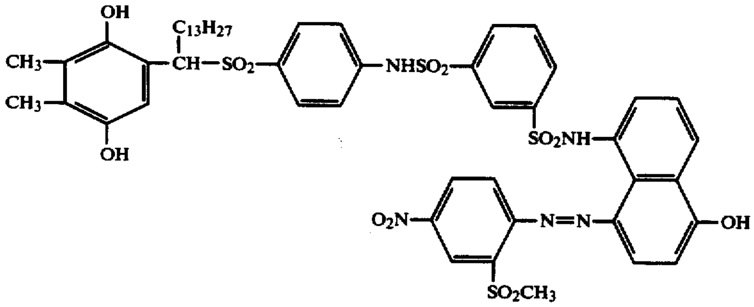
Cyan
(6)
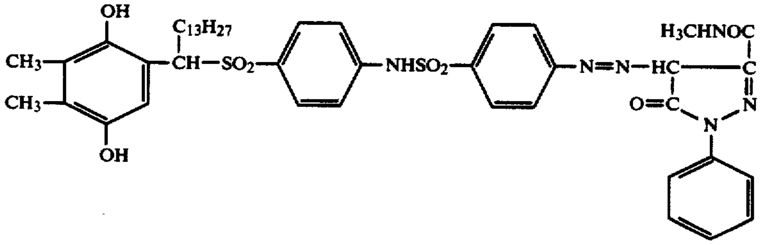
Yellow -continued
(7) Cyan
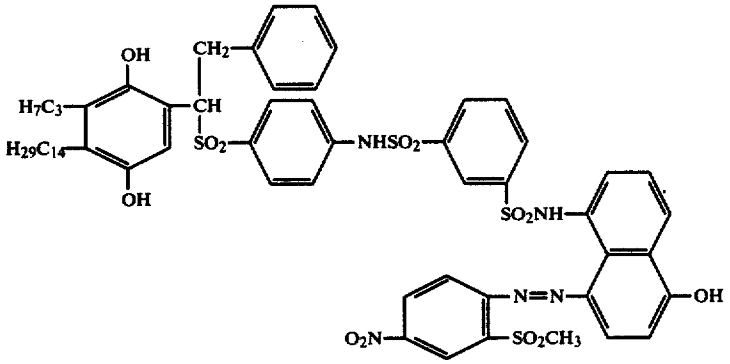
(8) Magenta
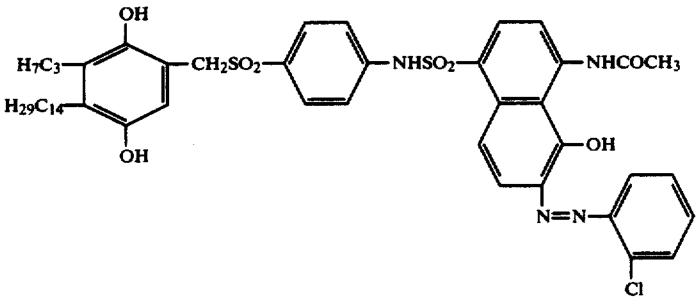
(9) Cyan
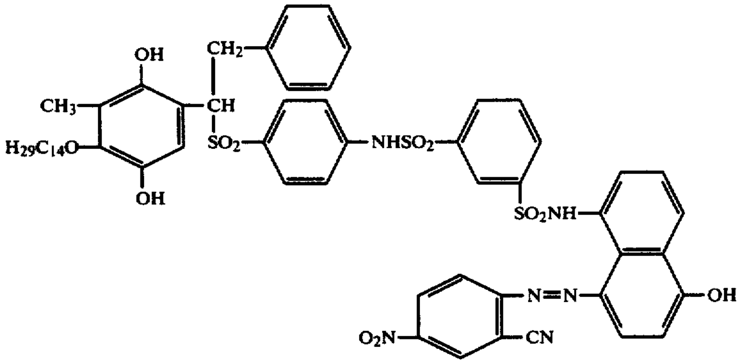
(10) Magenta
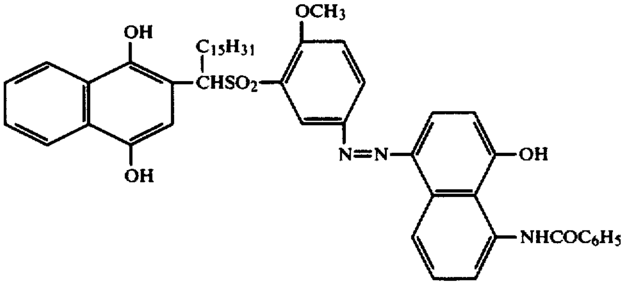

-continued
(11)
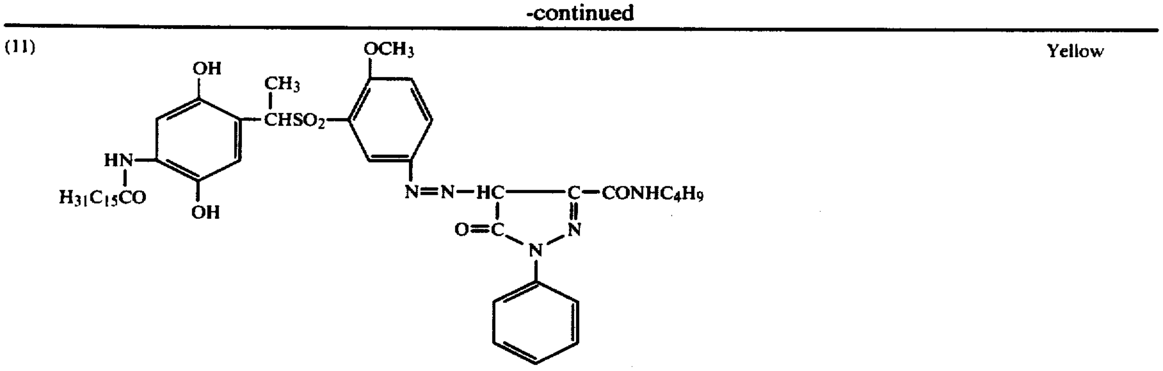
Yellow
(12)
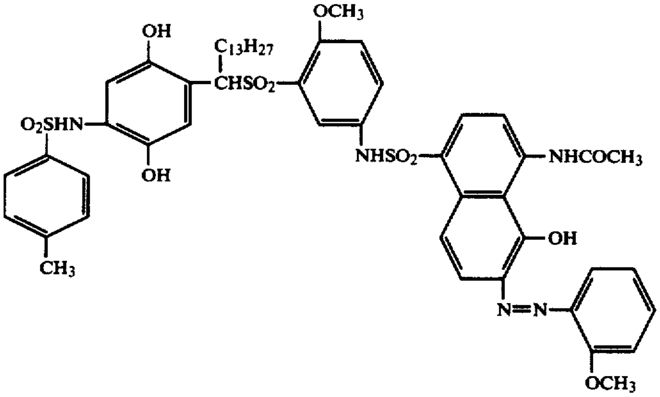
Magenta
(13)
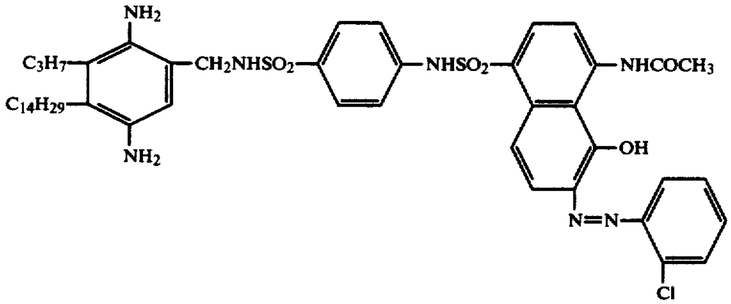
Magenta
(14)
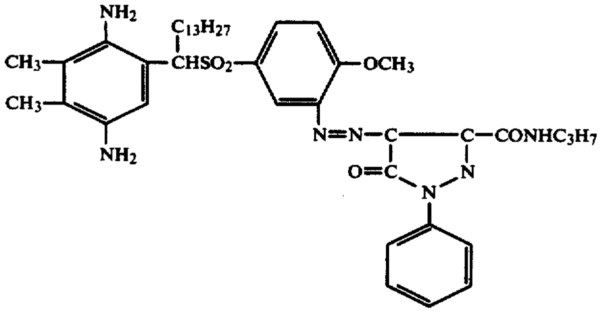
Yellow
(15)
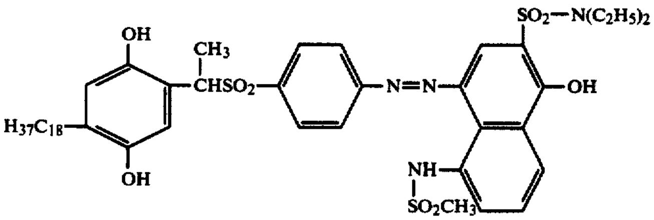
Magenta -continued
(16)
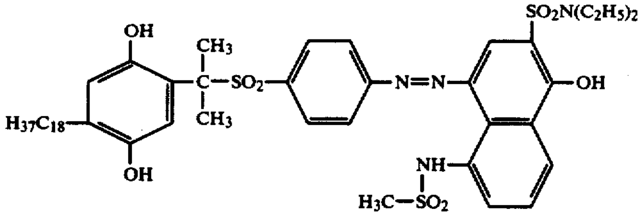
Magenta
(17)
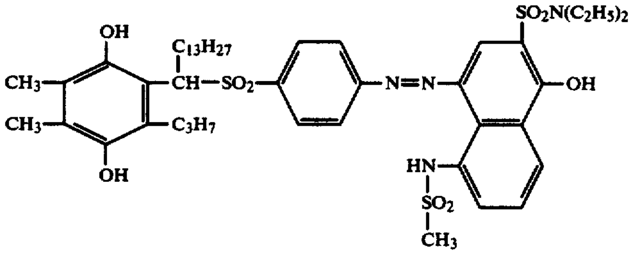
Magenta
(18)
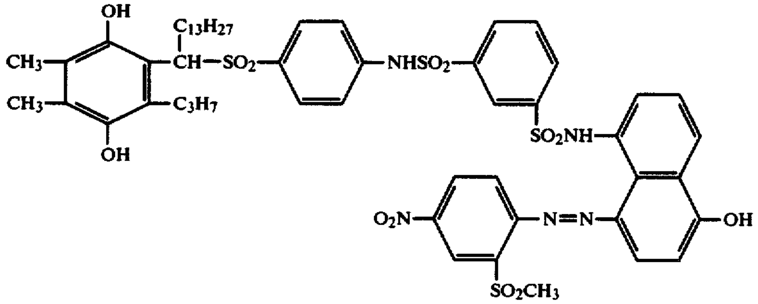
Cyan
(19)
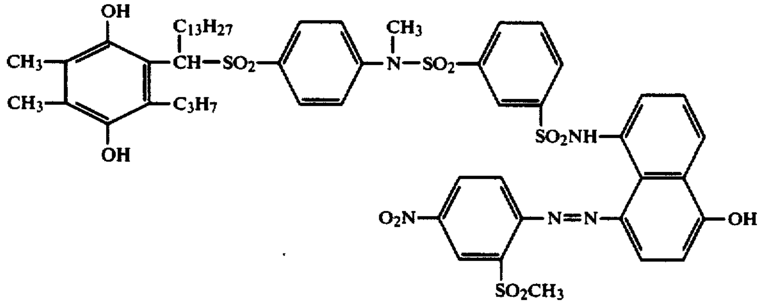
Cyan
(20)
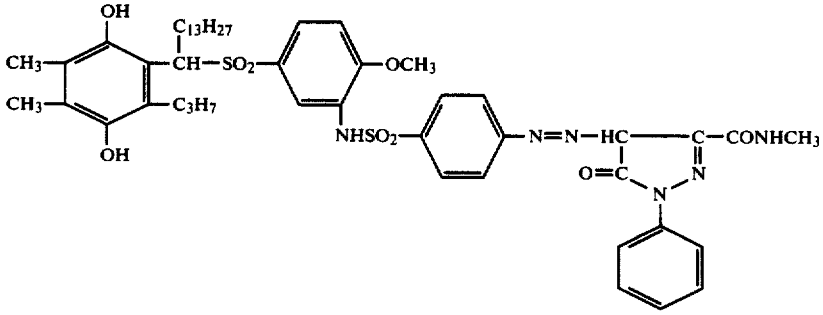
Yellow -continued
(21)
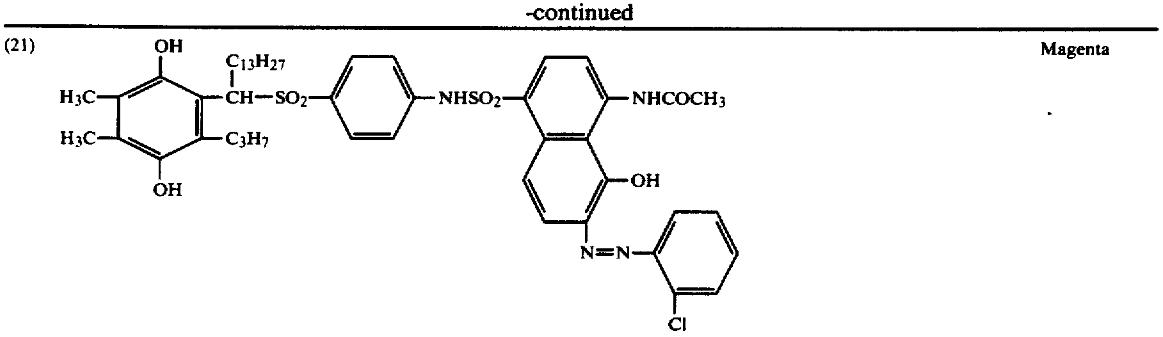
Magenta
(22)
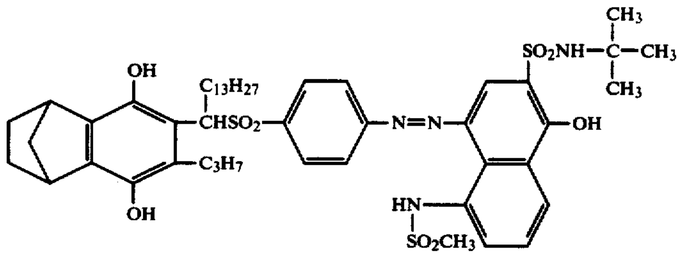
Magenta
(23)
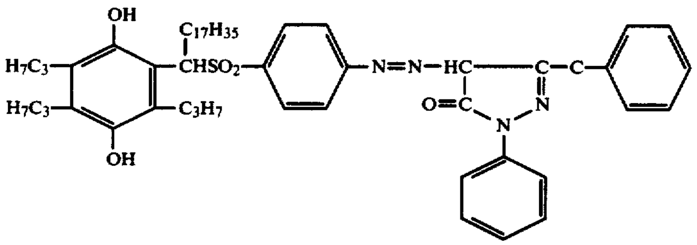
Yellow
(24)
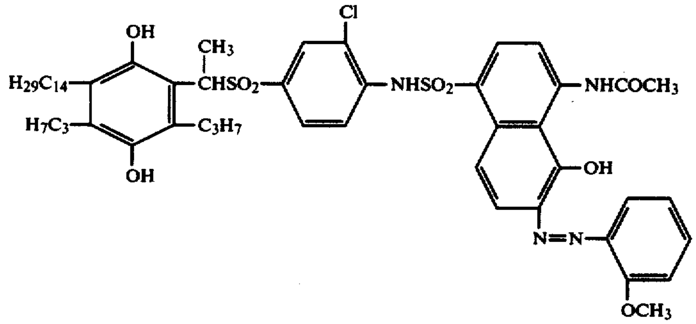
Magenta
(25)
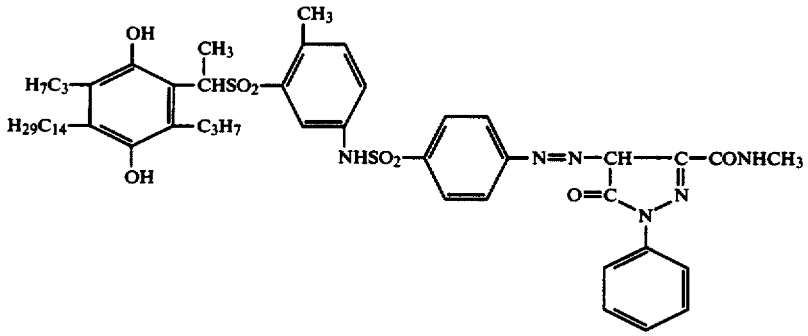
Yellow -continued
(26)
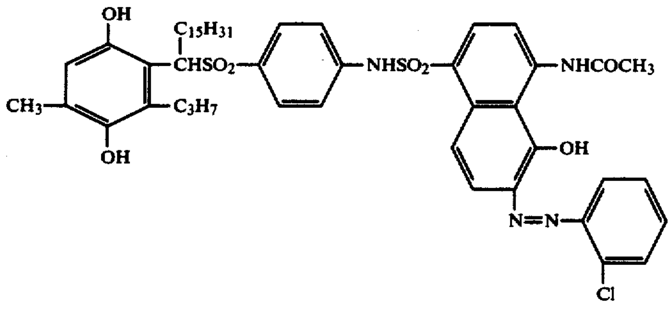
Magenta
(27)
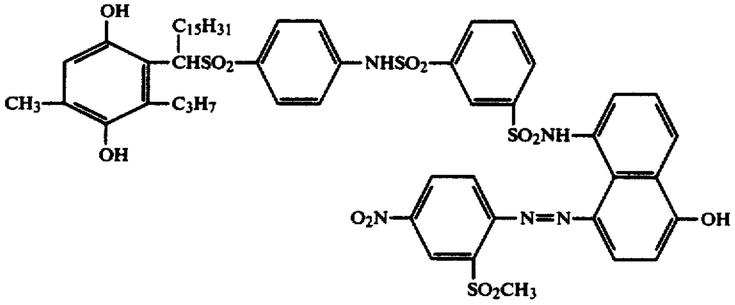
Cyan
(28)
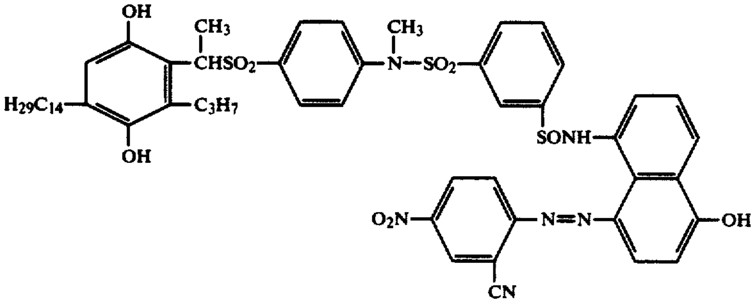
Cyan
(29)
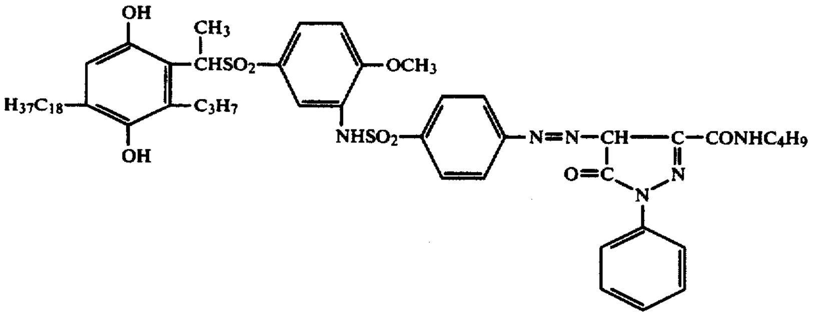
Yellow
(30)
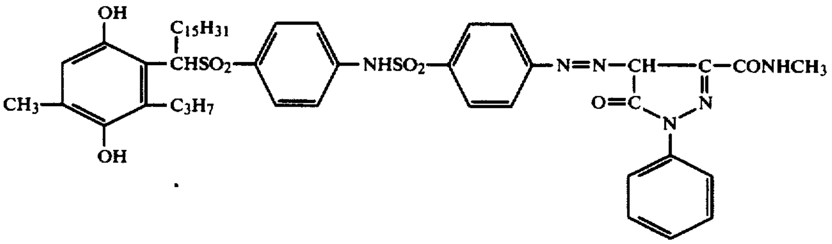
Yellow -continued
(31) Magenta
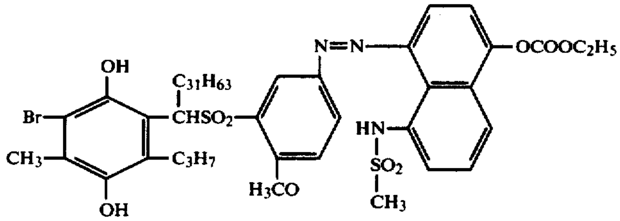
(32) Cyan
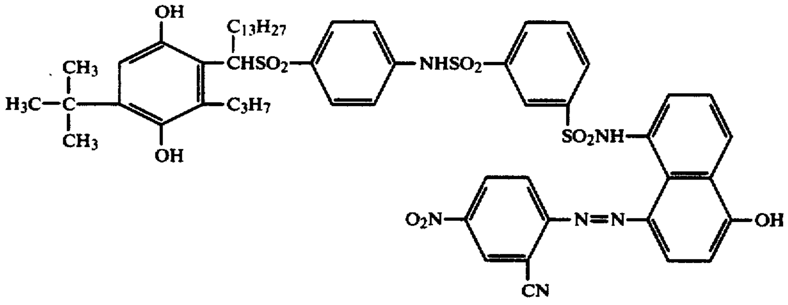
(33) Magenta
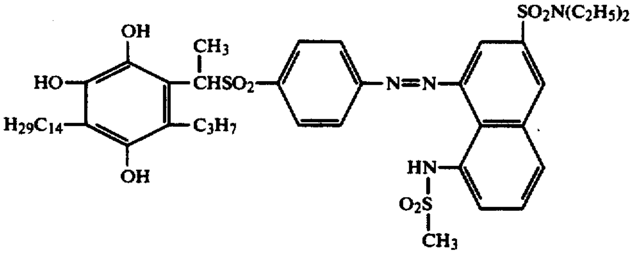
(34) Cyan
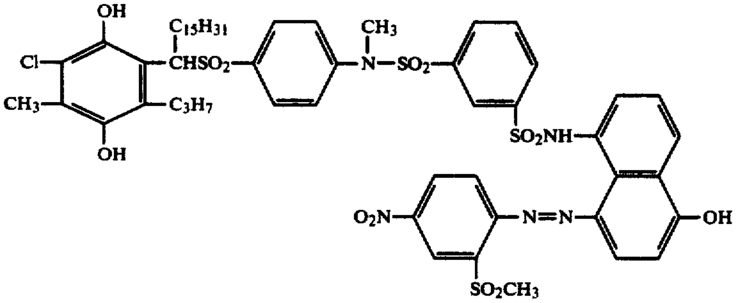
(35) Magenta
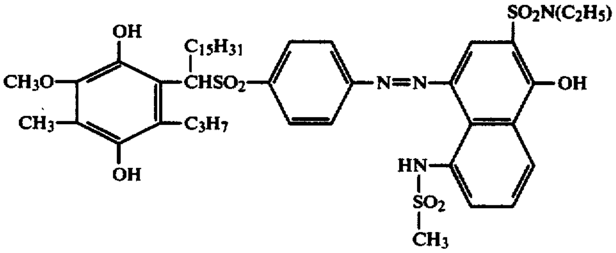

-continued
(36)
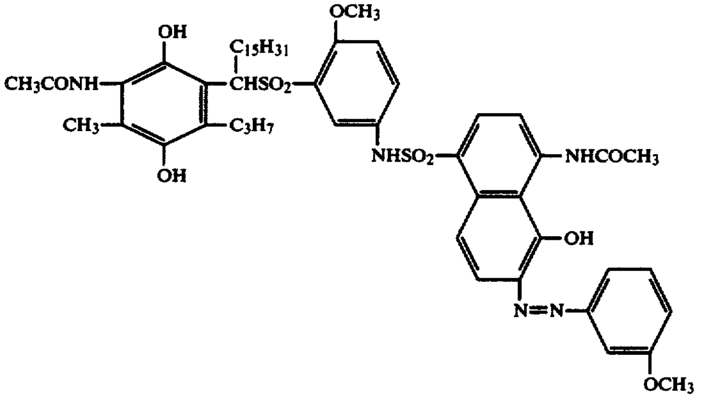
Magenta
(37)
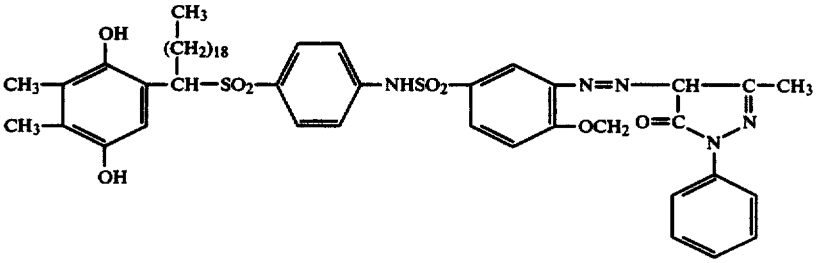
Yellow
(38)
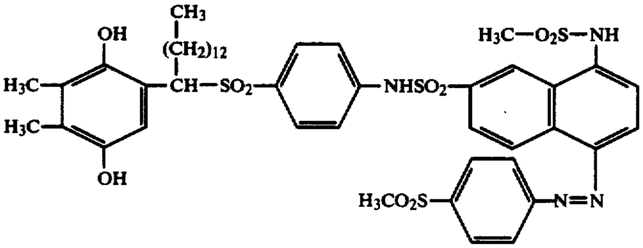
Magenta
(39)
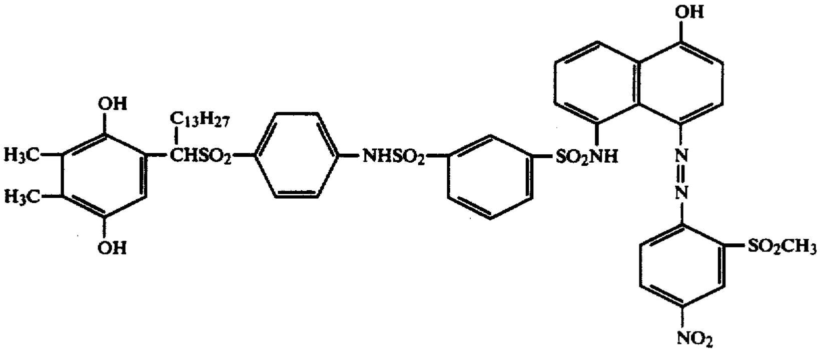
Cyan
(40)
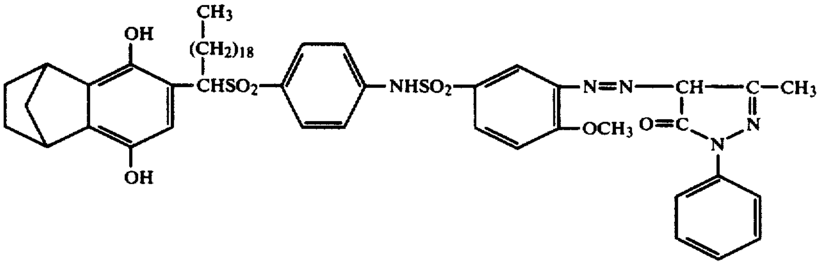
Yellow -continued
(41)
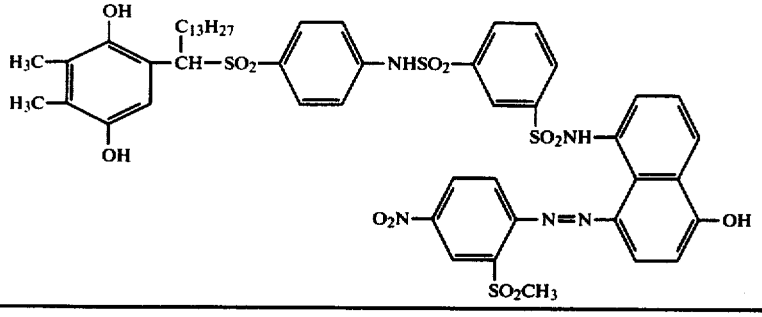
Cyan
-continued
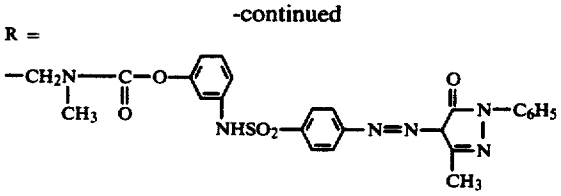
Practical examples of the compound of this invention shown by general formula (II) are shown below:
II-1
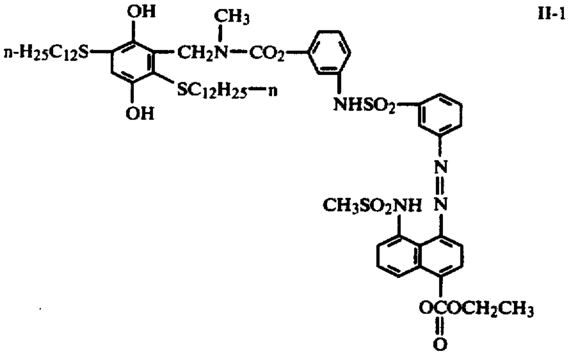
II-2
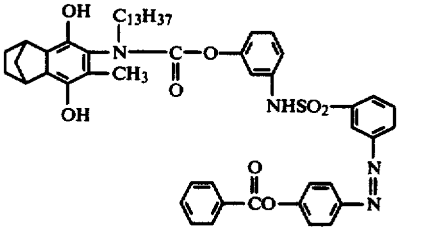
II-3
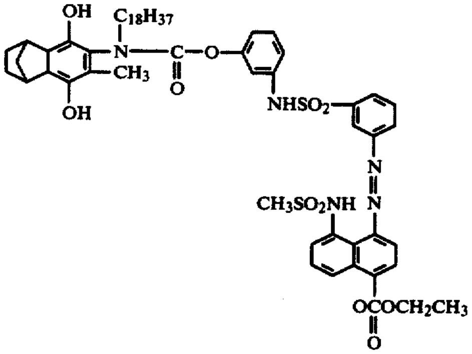
II-4
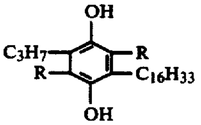
II-5
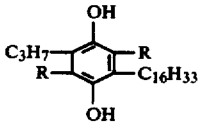
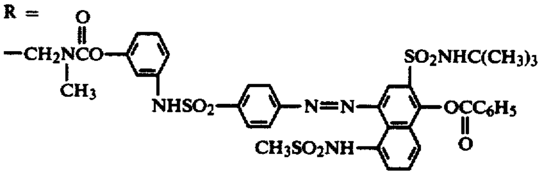
II-6
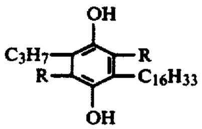
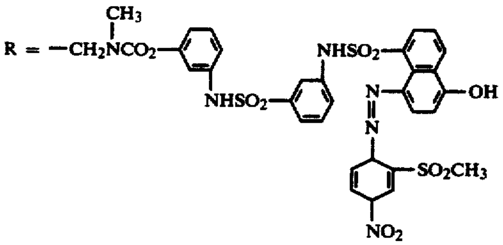
II-7
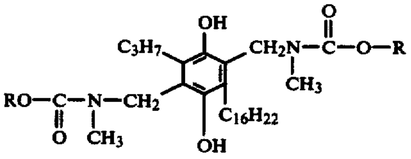
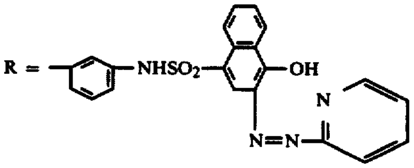

-continued

II-8

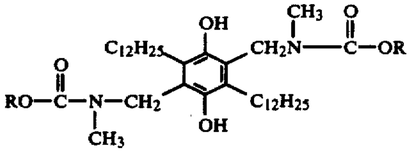

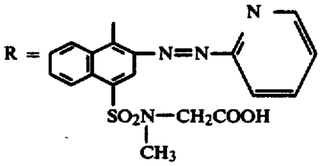

II-9

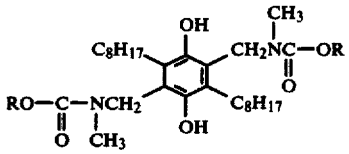

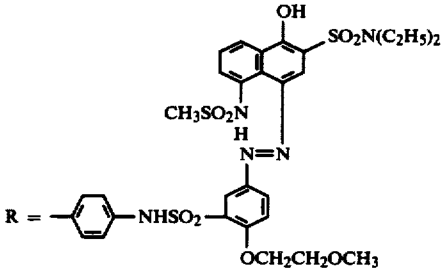

II-10

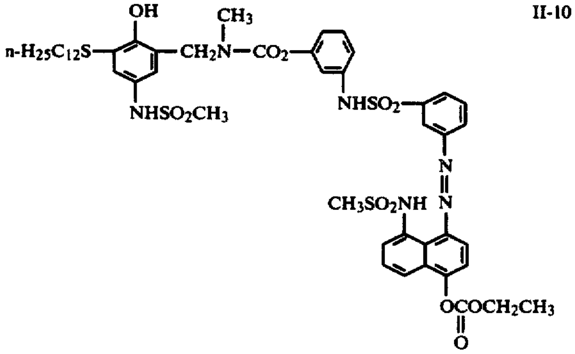

II-11

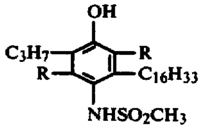

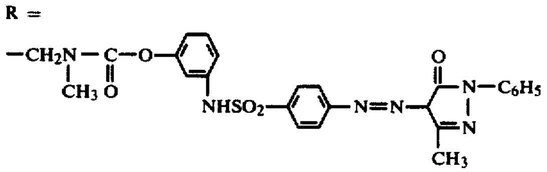

II-12

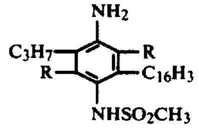

-continued

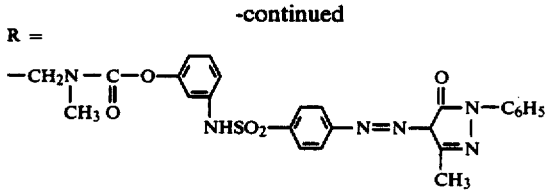

Processes of preparing these compounds are described in U.S. Pat. No. 3,980,479.

The addition amount of the dye-providing material used in this invention is 0.01 mole to 4 moles, preferably 0.05 mole to 2 moles, per mole of silver halide.

The dye-providing material of this invention can be incorporated in the layer or layers of a light-sensitive material by, for example, the method described in U.S. Pat. No. 2,322,027. In this case an organic solvent having a high boiling point (a boiling point of higher than about 160° C.) and an organic solvent having a low boiling point as shown below can be used. For example, there are organic solvents having a high boiling point such as phthalic acid alkyl esters (e.g., dibutyl phthalate, dioctyl phthalate, etc.), phosphoric acid esters (e.g., diphenyl phosphate, triphenyl phosphate, tricresyl phosphate, dioctylbutyl phosphate, etc.), citric acid esters (e.g., tributyl acetylcitrate, etc.), benzoic acid esters (e.g., octyl benzoate, etc.), alkylamides (e.g., diethyl laurylamide) fatty acid esters (e.g., dibutoxyethyl succinate, dioctyl azelate, etc.), trimesic acid esters (e.g., tributyl trimesate, etc.), etc., and low boiling organic solvents having boiling points of about 30° C. to 160° C., such as lower alkyl acetates (e.g., ethyl acetate, butyl acetate, etc.), ethyl propionate, secondary butyl alcohol, methyl isobutyl ketone, β-ethoxyethyl acetate, methylcellosolve acetate, cyclohexanone, etc.

The dye-providing material of this invention is dissolved in the foregoing organic solvent and is dispersed in an aqueous solution of a hydrophilic colloid. The foregoing organic solvent having a high boiling point and that having a low boiling point may be used as a mixture of them.

The amount of the organic solvent having a high boiling point used in this invention is less than 10 g, preferably 0.01 g to 5 g, per gram of the dye-providing material.

Also, the dispersion methods using polymers as described in Japanese Patent Publication No. 39,853/'76 and Japanese Patent Application (OPI) No. 59,943/'76 can be used for incorporating the dye-providing material of this invention in a light-sensitive material. Also, in the case dispersing the dye-providing material in a hydrophilic colloid solution, various surface active agent as shown hereafter can be used.

In certain preferred embodiments, the dye-releasing activator (electron donor) is used in combination with an electron-transfer agent (herein referred to as ETA). Generally, the electron-transfer agent is a compound which is a much better silver halide developer under the conditions of processing than the electron donor and, in those instances where the electron donor is incapable of or substantially ineffective in developing the silver halide, the ETA functions to develop the silver halide and provide a corresponding imagewise pattern of destroyed electron donor because the oxidized ETA readily accepts electrons from the donor. Generally, the useful ETA's will at least provide a faster rate of silver halide development under the conditions of processing when the combination of the electron donor and the ETA is employed as compared with the development rate when the electron donor is used in the process without the ETA. In highly preferred embodiments, the ETA has a slow redox t½ with ballast electron-accepting nucleophilic displacement (BEND) which is at least slower than the redox t½ (half-life) of the electron donor with BEND and preferably at least 10 times slower; this embodiment allows a high degree of freedom in obtaining the optimum silver halide developing rates while also providing freedom in obtaining the optimum release rate with the BEND compounds.

Typical useful ETA compounds include hydroquinone compounds such as hydroquinone, 2,5-dichlorohydroquinone and 2-chlorohydroquinone; aminophenol compounds such as 4-amino-phenol, N-methylaminophenol, 3-methyl-4-aminophenol and 3,5-dibromoaminophenol; catechol compounds such as catechol, 4-cyclohexylcatechol, 3-methoxy catechol and 4-(N-octadecylamino)catechol; phenylenediamine compounds such as N,N-diethyl-p-phenylenediamine, 3-methyl-N,N-diethyl-p-phenylenediamine, 3-methoxy-N-ethyl-N-ethoxy-p-phenylenediamine and N,N,N',N'-tetramethyl-p-phenylenediamine. In highly preferred embodiments, the ETA is a 3-pyrazolidone compound such as 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl 3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(3-chlorophenyl)-3-pyrazolidone, 1-(4-chlorophenyl)-3-pyrazolidone, 1-(4-tolyl)-4-methyl-3-pyrazolidone, 1-(2-tolyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone and 5-methyl-3-pyrazolidone. A combination of different ETA's such as those disclosed in U.S. Pat. No. 3,039,869 and also be employed. Such developing agents can be employed in the liquid processing composition or may be contained, at least in part, in any layer or layers of the photographic element or film unit such as the silver halide emulsion layers, the dye image-providing material layers, interlayers or image-receiving layer. The particular ETA selected will, of course, depend on the particular electron donor and BEND used in the process and the processing conditions for the particular photographic element.

The photographic silver halide emulsions or other hydrophilic colloid layers of the light-sensitive material of this invention may contain various surface active agents for various purposes such as a coating aid, static prevention, improvement of sliding property, dispersion by emulsification, sticking prevention and improvement of photographic properties (e.g., acceleration of development, gradation improvement, sensitization, etc.).

Examples of the surface active agents used for the purposes are nonionic surface active agents such as saponin (steroid series), alkylene oxide derivatives (e.g., polyethylene glycol, polyethylene glycol/polypropylene glycol condensation products, polyethylene glycol alkyl ethers, polyethylene glycol alkylaryl ethers, polyethylene glycol esters, polyethylene glycol sorbitan esters, polyalkylene glycol alkylamines, polyalkylene glycol alkylamides, and polyethylene oxide addition products of silicone), glycidol derivatives (e.g., alkenylsuccinic acid polyglyceride, alkylphenol polyglyceride, etc.), fatty acid esters of polyhydric alcohols, alkyl esters of sugar, etc.; anionic surface active agents having an acid group (e.g., a carboxy group, a sulfo group, a phospho group, a sulfuric acid ester group, a phosphoric acid ester group, etc.), such as alkyl carboxylates, alkyl sulfonates, alkylbenzene sulfonates, alkylnaphthalene sulfonates, alkylsulfonic acid esters, alkylphosphoric acid esters, N-acyl-N-alkyltaurines, sulfosuccinic acid esters, sulfoalkyl polyoxyethylene alkylphenyl ethers, polyoxyethylene alkylphosphoric acid esters, etc.; amphoteric surface active agents such as aminoacids, aminoalkylsulfonic acids, aminoalkylsulfuric acid esters, aminoalkylphosphoric acid esters, alkylbetains, amine oxides, etc.; and cationic surface active agents such as alkylamines, aliphatic quaternary ammonium salts, aromatic quaternary ammonium salts, heterocyclic quaternary ammonium salts (e.g., pyridinium, imidazolium, etc.), phosphonium salts or sulfonium salts containing an aliphatic ring or heterocyclic ring.

Among the foregoing surface active agents, polyethylene glycol type nonionic surface active agents having a repeating unit of ethylene oxide in the molecules are preferred for use in the light-sensitive materials.

The image-forming dyes released from the compounds used in this invention are described to have the properties: (1) the dyes have hues suitable for color reproduction, (2) the molecular extinction coefficient is large, (3) the dye is stable to light, heat, and the dye-releasing activator and other additives contained in the system, (4) the dye can be easily prepared, (5) the dye has a hydrophilic property and has a mordanting property, especially, for a cationic mordanting layer, etc.

As the silver halide used in this invention, there are silver chloride, silver chlorobromide, silver chloroiodide, silver bromide, silver iodobromide, silver chloroiodidobromide, silver iodide, etc.

The particularly preferred silver halide in this invention contains a silver iodide crystal in a part of the silver halide grain. That is, the silver halide which shows the pattern of pure silver iodide in X-ray diffraction of it is particularly preferred.

In a photographic material a silver halide containing two or more halogen atoms is usually used. In ordinary silver halide emulsions, the silver halide grains form complete crystals. For example, when the X-ray diffraction of the grains of a silver iodobromide emulsion is measured, the patterns of silver iodide crystals and silver bromide crystals do not appear but the X-ray pattern appears at the positions corresponding to the mixing ratio of the both crystals and intermediate of them.

Particularly preferred silver halides in this invention are silver chloroiodide, silver iodobromide, and silver chloroiodobromide each containing silver iodide crystals in the grains.

Such a silver halide may be obtained in the following manner. For example, silver iodobromide can be obtained by adding an aqueous silver nitrate solution to an aqueous potassium bromide solution to first form silver bromide grains and thereafter adding thereto potassium iodide.

The mean grain size of the silver halide used in this invention is from 0.001 μm to 10 μm, preferably from 0.001 μm to 5 μm.

Also, a mixture of two or more kinds of silver halides each having a different mean grain size and/or halogen component may be used as the silver halide in this invention.

The silver halide emulsion used in this invention may be used as it is or may be chemically sensitized by a chemical sensitizer such as compounds of sulfur, selenium, tellurium, etc., or compounds of gold, platinum, palladium, rhodium, iridium, etc.; a reducing agent such a tin halide, etc.; or a combination of them. The details of these chemical sensitizations are described in, for example, T. H. James; "The Theory of the Photographic Process", 4th Ed., Chapter 5, pages 149–169.

A silver halide and the dye-providing material may be incorporated in the same layer of the light-sensitive material of this invention or a layer containing a silver halide may be formed on or under a layer containing the dye-providing material.

It is preferred that the photosensitive silver halide is coated at 50 mg to 10 $g/m^2$ based on the silver.

In this invention the use of an organic silver salt oxidizing agent is advantageous since in this case the oxidation reduction reaction is accelerated and the maximum coloring density of dye is increased.

When the light-sensitive material containing the organic silver salt oxidizing agent is heated to a temperature of higher than 80° C., preferably higher than 100° C., more preferably higher than 110° C., the organic silver salt oxidizing agent reacts with the foregoing image-forming material such that the silver halide is reduced to silver to form a silver image at the corresponding position where the silver halide is reduced.

Examples of such an organic silver salt oxidizing agent are as follows.

That is, they are silver salts of organic compounds having a carboxy group and typical examples are silver salts of aliphatic carboxylic acids and silver salts of aromatic carboxylic acids.

Examples of the silver salts of aliphatic carboxylic acids are silver salts of behenic acid, stearic acid, oleic acid, lauric acid, capric acid, myristic acid, palmitic acid, maleic acid, fumaric acid, tartaric acid, furoic acid, linolic acid, adipic acid, sebacic acid, succinic acid, acetic acid, butyric acid, camphoric acid, etc. Also, the foregoing silver salts substituted with a halogen atom or a hydroxy group are useful.

Examples of the silver salts of aromatic carboxylic acids or other carboxy group-having compounds are silver salts of benzoic acid, a substituted benzoic acid such as 3,5-dihydroxybenzoic acid, o-methylbenzoic acid, m-methylbenzoic acid, p-methylbenzoic acid, 2,4-dichlorobenzoic acid, acetamidobenzoic acid, and p-phenylbenzoic acid; gallic acid, tannic acid, phthalic acid, terephthalic acid, salicylic acid, phenylacetic acid, and pyromellitic acid, the silver salts of 3-carboxymethyl-4-methyl-4-thiazolin-2-thion described in U.S. Pat. No. 3,785,830, and the silver salts of aliphatic carboxylic acids having a thioether group described in U.S. Pat. No. 3,330,663.

Other examples of the organic silver salt oxidizing agent are the silver salts of a compound having a mercapto group or a thion group and the derivatives thereof.

For example, there are silver salts of 3-mercapto-4-phenyl-1,2,4-triazole, 2-mercaptobenzimidazole, 2-mercapto-5-aminothiadiazole, 2-mercaptobenzothiazole, 2-(s-ethyl glycol amido) benzothiazole, thioglycolic acid described in Japanese Patent Application (OPI) No. 28,221/'73 (e.g., s-alkylthioglycolic acids, the carbon atom number of the alkyl group being 12 to 22), dithiocarboxylic acids (e.g., dithioacetic acid), thioamide, 5-carboxy-1-methyl-2-phenyl-4-thiopyridine, mercaptotriazine, 2-mercaptobenzoxazole, and mercaptoxadiazole, the silver salts described in U.S. Pat. No. 4,123,274 (e.g., the silver salt of 3-amino-5-benzylthio-1,2,4-triazole which is a 1,2,4-mercaptotriazole derivative), and the silver salts of thion compounds such as the silver salt of 3-(2-carboxyethyl)-4-methyl-4-thiazoline-2-thion described in U.S. Pat. No. 3,301,678.

Other examples of the organic silver salt oxidizing agent are the silver salts of compounds having an imino group. For example, there are silver salts of benzotriazole and the derivatives thereof as described in Japanese Patent Publication Nos. 30,270/'69 and 18,416/'70, for example, the silver salt of benzotriazole, the silver salts of alkyl-substituted benzotriazoles such as the silver salt of methylbenzotriazole, etc.; the silver salts of halogen-substituted benzotriazoles such as the silver salt of 5-chlorobenzotriazole, etc.; the silver salts of carboimidobenzotriazoles such as the silver salt of butylcarboimidobenzotriazole, etc.; the silver salt of 1,2,4-triazole and the silver salt of 1-H-tetrazole as described in U.S. Pat. No. 4,220,709; the silver salt of carbazole, the silver salt of saccharin, and the silver salts of imidazole and imidazole derivatives.

Also, the organic metal salts such as the silver salts and copper stearate described in "Research Disclosure", Vol. 170, No. 17029, June 1978 can be used as the organic metal oxidizing agent.

The heat developing mechanism of this invention during heat has not yet been clarified but is considered to be as follows.

That is, when a silver halide light-sensitive material is exposed to light, a latent image is formed with the silver halide. The formation of a latent image is described in, for example, T. H. James, "The Theory of the Photographic Process", 3rd Ed., pages 105–148.

Then, when the light-sensitive material thus light-exposed is heated, the dye-providing material reacts with the silver halide having the latent image and the nucleophilic group of the dye-providing material is oxidized, whereby the dye-providing material thus oxidized does not cause the release of dye by the nucleophilic reaction upon heating. On the other hand, the dye-providing material which does not react with the silver halide, i.e., the silver halide having no latent image, causes the release of dye by the nucleophilic group of the material. As the result, a color image opposite to the silver image is formed.

The foregoing reaction can proceed even at a lower temperature if a base exists in the system at heating and further if the organic silver salt oxidizing agent exists in the system, the reaction proceeds more quickly and also the minimum density of the color image formed becomes lower.

The above description relates to using a negative silver halide emulsion but when a direct positive silver halide emulsion is used, the dye-providing material reacts with the silver halide at the non-exposed areas and thereafter, the same reaction as above follows.

It is necessary that the silver halide and the organic silver salt oxidizing agent which become the development initiating points exist within a substantially effective distance. It is preferred that the silver halide and the organic silver salt oxidizing agent exist in the same layer of the light-sensitive material.

For incorporating the silver halide and the organic silver oxidizing agent in a same layer, a coating composition for the layer containing a mixture of both the components may be prepared and, in this case, it is effective to mix both the components in a ball mill for a long period of time. Also, it is effective for the purpose to add a halogen-containing compound to the organic silver salt oxidizing agent to form silver halide from silver derived from the organic silver salt oxidizing agent and the halogen from the halogen-containing compound.

Methods of preparing the silver halide and the organic silver salt oxidizing agent and methods of mixing them are described in, for example, "Research Disclosure", No. 17029; Japanese Patent Application (OPI) Nos. 32,928/'75 and 42,529/'76; U.S. Pat. No. 3,700,458; and Japanese Patent Application (OPI) Nos. 13,224/'74 and 17,216/'75.

The proper amount of the organic silver salt oxidizing agent which is used, if necessary, in this invention, is usually from 0.01 mole to 200 moles per mole of the silver halide and in the case of coating the coating composition containing both the silver halide and the organic silver salt oxidizing agent, it is proper that the coverage of both the components is usually 50 mg to 10 $g/m^2$ based on the total amount of silver in both of the components.

The photosensitive silver and the organic silver salt oxidizing agent in this invention are dispersed in the following binder or binders. Also, the dye-providing material is dispersed in a binder described below.

The binders used in photographic materials used in this invention can be used solely or as a combination of them. Hydrophilic binders are used in this invention. Typical hydrophilic binders are transparent or translucent hydrophilic colloids and examples of the hydrophilic binders are natural materials, e.g., proteins such as gelatin, gelatin derivatives, cellulose derivatives, etc., and polysaccharides such as starch, gum arabic, etc., and synthetic polymers such as water-soluble polyvinyl compounds such as polyvinylpyrolidone, acrylamide polymers, etc. As other synthetic polymers, there are dispersed vinyl compounds in a latex form for increasing, in particular, the dimensional stability of photographic materials.

For the image-forming process of this invention, various dye-releasing activators can be used. The dye-releasing activator accelerates the oxidation-reduction reaction of the dye-providing material with the silver halide and/or the organic silver salt oxidizing agent, or nucleophilically acts to the dye-providing material in the dye-releasing reaction which follows by the oxidation-reduction reaction to accelerate the release of dye. A base or a base-releasing agent is used as the dye-releasing activator. In this invention it is particularly advantageous to use the dye-releasing activator for accelerating the reaction.

Preferred examples of the bases used as the dye-releasing activator in this invention are amines such as trialkylamines, hydroxylamines, aliphatic polyamines, N-alkyl-substituted aromatic amines, N-hydroxyalkyl-substituted aromatic amines, and bis[p-(dialkylamino)-phenyl]methanes. Also, other materials useful as the dye-releasing activator are betaine, tetramethylammonium iodide, and diaminobutane dihydrochloride described in U.S. Pat. No. 2,410,644 and the organic compounds such as urea and aminoacids, e.g., 6-aminocaproic acid described in U.S. Pat. No. 3,506,444.

A base-releasing agent is a compound releasing a basic component by heating. Examples of typical base-releasing agents are described in U.K. Pat. No. 998,949. Preferred base-releasing agents are the salts of carboxylic acids and organic bases. Examples of useful carboxylic acids are trichloroacetic acid, trifluoroacetic acid, etc., and examples of useful base are guanidine, piperidine, morpholine, p-toluidine, 2-picoline, etc. Guanidine trichloroacetate described in U.S. Pat. No. 3,220,846 is particularly useful. Also, the aldonamides described in Japanese Patent Application (OPI) No. 22,625/'75 are preferably used since they are decomposed at high temperature to form bases.

These dye-releasing activators can be used over a wide range of amounts. It is advantageous that the molar ratio of the dye-releasing activator to the total amount of silver in the silver halide and the organic silver oxidizing agent is 1/100 to 100/1, particularly 1/20 to 20/1.

In this invention the use of a water-releasing compound is advantageous since the dye-releasing reaction is accelerated by the use of the compound.

A water-releasing compound is a compound which is decomposed during the heat development to release water and provides a vapor pressure of higher than $10^{-5}$ Torr in the photographic material at a temperature of 100° C. to 200° C. These compounds are known in copy printing for fibers and useful examples of them are $NH_4Fe(SO_4)_2.12H_2O$, etc., described in Japanese Patent Application (OPI) No. 88,386/'75.

In the image-forming process of this invention a compound which can accelerate the development and at the same time can stabilize the image formed can be used. Preferred examples of these compounds are isothiuroniums such as 2-hydroxyethyl isothiuronium trichloroacetate described in U.S. Pat. No. 3,301,678, bisisothiuroniums such as 1,8-(3,6-dioxaoctane)-bis(isothiuronium.trifluoroacetate) described in U.S. Pat. No. 3,669,670, thiol compounds described in West German Patent Application (Offenlegunsschrift) No. 2,162,714, thiazolium compounds such as 2-amino-2-thiazolium.-trichloroacetate, 2-amino-5-bromoethyl-2-thiazolium.-trichloroacetate, etc., described in U.S. Pat. No. 4,012,260, compounds having α-sulfonyl acetate as an acid moiety, such as bis(2-amino-2-thiazolium)methylenebis(sulfonium acetate), 2-amino-2-thiazolium phenylsulfonyl acetate, etc., described in U.S. Pat. No. 4,060,420, and compounds having 2-carboxycarboxyamide as an acid moiety described in U.S. Pat. No. 4,088,496.

The compound or a mixture of these compounds can be used over a wide range of amounts. That is, the amount of the compound or compounds is 1/100 to 10 times, in particular, 1/20 to 2 times by mole ratio, the amount of the total amount of silver in the silver halide and the organic silver salt oxidizing agent.

The image-forming process of this invention can be performed in the presence of a heat solvent. By the term "heat solvent" in this invention is meant a non-hydrolyzable organic material which is in a solid state in the environmental temperature but shows a mixture melting point together with another component or components at the heat treatment temperature employed or at a temperature lower than the heat treatment temperature (but about 10° C. higher than the environmental temperature, preferably at a temperature higher than 60° C.). As the heat solvent, a compound which becomes a solvent for the dye-providing material at the heat development and a compound which is a material having a high dielectric constant and accelerates the physical development of a silver salt are useful.

Preferred examples of useful heat solvent include glycols such as polyethylene glycol having a mean molecular weight of 1,500 to 20,000 described in U.S. Pat. No. 3,347,675; polyethylene oxide derivatives such as the oleic acid esters of polyethylene oxide, etc.; beeswax; monostearin; compounds of high dielectric constant having a —$SO_2$— group or —CO— group, such as acetamide, succinamide, ethyl carbamate, urea, methyl sulfonamide, ethylene carbonate, etc.; the polar materials described in U.S. Pat. No. 3,667,959; the lactone of 4-hydroxybutanic acid; methylsulfinylmethane; tetrahydrothiophene-1,1-dioxide; and 1,10-dicanediol, methyl anisate, biphenyl suberate, etc., disclosed in "Research Disclosure", December 1976, pages 26–28.

The dye-providing material contained in the light-sensitive material is a colored material and hence it is not so necessary to incorporate an irradiation preventing material or dye and an antihalation material or dye in the light-sensitive material but for further improving the sharpness of images formed, the filter dyes and light-absorptive materials described in Japanese Patent Publication No. 3692/'73 and U.S. Pat. Nos. 3,253,921; 2,527,583; 2,956,879, etc., can be incorporated in the light-sensitive materials of this invention. The foregoing dyes or materials having a heat decoloring property are preferred and examples of such dyes are described in U.S. Pat. Nos. 3,769,019; 3,745,009; and 3,615,432.

The light-sensitive materials used in this invention may, if necessary, contain various additives known as additives for heat developable light-sensitive materials or may have other layers than photosensitive silver halide emulsion layers, such as an antistatic layer, an electrically conductive layer, a protective layer, an interlayer, an antihalation layer, a peeling layer, etc. Examples of the additives are described in "Research Disclosure", Vol. 170, No. 17029, June 1978, such as plasticizers, sharpness improvement dyes, antihalation dyes, sensitizing dyes, matting agents, surface active agents, optical whitening agents, antifading agents, etc.

The light-sensitive material used in this invention can be prepared by preparing the coating liquids for a heat developable light-sensitive layer or layers, and, if necessary other layers such as a protective layer, an interlayer, a subbing layer, a backing layer, etc., and coating these coating liquids, in succession, on a support by, for example a dip coating method, an air knife coating method, a curtain coating method, or the hopper coating method described in U.S. Pat. No. 3,681,294.

Furthermore, if necessary, two or more layers can be simultaneously coated on a support by the method disclosed in U.S. Pat. No. 2,761,791 and U.K. Pat. No. 837,095.

In this invention various exposure means may be employed. A latent image is obtained by the imagewise exposure of radiation containing visible light. In general, light sources used for ordinary color prints, for example, a tungsten lamp, a mercury lamp, a halogen lamp such as iodine lamp, etc., a xenon lamp, a laser light source, as well as a CRT light source, a fluorescent lamp, a luminous diode, etc., can be used in this invention.

As an original for forming an image in this invention, a line image such as a drafting, etc., as well as a photographic image having a continuous gradation can be used. Also, persons or scenes may be photographed using a camera. Printing from an original may be performed by contact printing, reflection printing, or enlarged printing.

Also, an image photographed by a video camera, etc., or image information sent from a television station is directly reproduced on CRT or FOT and the image thus reproduced can be printed by focusing the image onto the heat developable photographic material by contact printing or by means of a lens.

Recently, LEDs (luminous diodes) have been greatly developed and have been used as an exposure means or indicating means in various devices. It is difficult to make an LED effectively emitting blue light. Thus, in the case of reproducing natural color images using an LED as light sources, three kinds of LEDs emitting green light, red rays, and infrared light are used and the light-sensitive material having the layers each sensitive to each of these lights and releasing each of yellow, magenta, and cyan dyes may be used.

That is, the light-sensitive material having a green-sensitive portion (layer) containing a yellow dye-providing material, a red-sensitive portion (layer) containing a magenta dye-providing material and an infrared ray-sensitive portion (layer) containing a cyan dye-providing material may be used. If necessary, other combinations can be used as a matter of course.

Another method of directly printing the original by contact printing or projection printing is the following method. That is, an original image from a light source is received by a light-receptive element such as a photoelectric tube or CCD, stored in a memory such as a computer, after, if necessary, applying image processing to the stored image information, the image information is reproduced on a CRT, and the image thus reproduced is printed on the light-sensitive material as an imagewise light source. Furthermore, three kinds of the foregoing LEDs are energized based on the processed image information to emit each light for imagewise exposing the light-sensitive material.

In this invention, the latent image obtained on the light-sensitive material by light exposure can be developed by overall heating the light-sensitive material to a temperature of about 80° C. to about 250° C. for about 0.5 sec. to about 300 sec. The heating temperature may be desirably selected in the foregoing temperature range with the increase or decrease of the heating time. In particular, a temperature range of about 110° C. to about 160° C. is useful. The heating means may be a simple hot plate, a hot iron, a hot roller, an exothermic material utilizing carbon, titanium white, etc., or similar materials. The heating may also be conducted at the same time with the exposure.

For practically forming a color image in this invention, the mobile dye or dyes obtained by the heat development may be transferred on to a dye-fixing layer or material. For the purpose, the heat developable color photographic material is composed of at least one light-sensitive layer (I) containing at least a silver halide, a reducible dye-releasing agent, and a binder formed on a support and a dye-fixing layer (II) capable of receiving the diffusible dye or dyes formed in the layer (I).

The dye-releasing activator may be incorporated in the light-sensitive layer (I) or dye-fixing layer (II). Or, further, a means of applying a dye-releasing activator (for example, rupturable pods containing the dye-releasing activator, a roller impregnated with the dye-releasing activator, or a means for spraying a liquid containing the dye-releasing activator) may be employed.

Foregoing light-sensitive layer (I) and dye-fixing layer (II) may be formed on the same support or may be formed on separate supports, respectively. The dye-fixing layer (II) and the light-sensitive layer (I) may be separated from each other. For example, after image exposure, the light-sensitive material having the dye-fixing layer and the light-sensitive layer is developed by uniformly heating and then the dye-fixing layer or the light-sensitive layer can be peeled off.

Furthermore, when the light-sensitive material having light-sensitive layer (I) on a support and a dye-fixing material having dye-fixing layer (II) on a support are separately formed, after image exposing and uniformly heating the light-sensitive material, the dye-fixing material is superposed on the light-sensitive material, whereby the mobile dye or dyes can be transferred to the dye-fixing layer (II).

Also, the light-sensitive material only can be imagewise exposed and then after superposing the dye-fixing material on the light-sensitive material, they may be uniformly heated in the superposed state.

Dye-fixing layer (II) may contain, for example, a dye mordant for fixing a mobile dye or dyes. As the mordant, various mordants can be used and polymer mordants are particularly useful. The dye-fixing material may have another layer or layers in addition to the dye-fixing layer (II) and further may contain a base, a base precursor, and/or a heat solvent in addition to the mordant. In particular, when light-sensitive layer (I) and dye-fixing layer (II) are formed on separate supports, respectively, it is useful to incorporate a base or a base precursor in the dye-fixing material having dye-fixing layer (II).

Examples of the polymer mordant used in this invention are, for example, a polymer having a secondary amino group or a tertiary amino group, a polymer having a nitrogen-containing heterocyclic moiety, and a polymer having the quaternary cationic group thereof, the molecular weight of these polymers being 5,000 to 20,000, in particular 10,000 to 50,000.

For example, there are the vinylpyridine polymers and vinylpyridinium cation polymers disclosed in U.S. Pat. Nos. 2,548,564; 2,484,430; 3,148,061; 3,756,814; etc.; the polymer mordants crosslinkable with gelatin, etc. disclosed in U.S. Pat. Nos. 3,625,494; 3,859,096; and 4,128,538; U.K. Pat. No. 1,277,453, etc.; the aqueous sol-type mordants disclosed in U.S. Pat. Nos. 3,958,995; 2,721,852; and 2,798,063; and Japanese Patent Application (OPI) Nos. 115,228/'79; 145,529/'79; and 126,027/'79; the water-insoluble mordants disclosed in U.S. Pat. No. 3,898,088; the reactive mordants capable of making a covalent bond to dyes disclosed in U.S. Pat. No. 4,168,976; and further the mordants disclosed in U.S. Pat. Nos. 3,709,690; 3,788,855; 3,642,482; 3,488,706; 3,557,066; 3,271,147; 3,271,148; 2,675,316 and 2,882,156; and Japanese Patent Application (OPI) Nos. 71,312/'75; 30,328/'78; 155,528/'77; 125/'78; and 1024/'78.

Among these mordants, the mordants capable of crosslinking with a materix such as gelatin, etc.; water-insoluble mordants, and aqueous sol-type (or latex dispersion-type) mordants are preferably used in this invention.

Particularly preferred mordants are shown below.

(1) A polymer having a quaternary ammonium group and a group capable of forming a covalent bond to gelatin (e.g., an aldehyde group, chloroalkanoyl group, chloroalkyl group, vinylsulfonyl group, pyridiniumpropionyl group, vinylcarbonyl group, alkylsulfonoxy group, etc.), such as, for example, the polymer of the following formula:

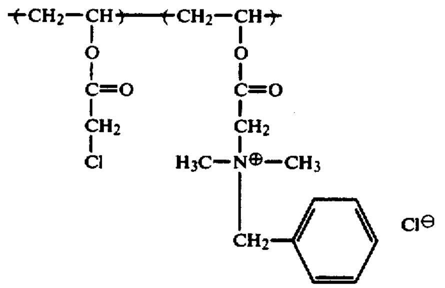

(2) A reaction product of a copolymer composed of the repeating unit of the monomer shown by the following general formula and a repeating unit of an other ethylenically unsaturated monomer and a crosslinking agent (e.g., bis-alkane sulfonate, bis-allene sulfonate, etc.):

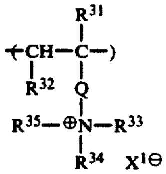

$R^{31}$: H, alkyl group; $R^{32}$: H, alkyl group, aryl group; Q: conventionally known divalent group; $R^{33}$, $R^{34}$, $R^{35}$: alkyl group, aryl group; at least two of $R^{33}$ to $R^{35}$ may combine with each other to form a heterocyclic ring; $X^1$: anion such as a halogen ion and sulfonyl ion.

The foregoing alkyl group and aryl group may be substituted.

(3) The polymer shown by the following general formula:

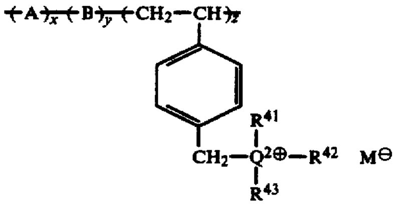

x: about 0.25 to about 5 mole%
y: about 0 to about 90 mole%
z: about 10 to about 99 mole%
A: repeating unit derived from a monomer having at least two ethylenically unsaturated bonds
B: repeating unit derived from a copolymerizable ethylenically unsaturated monomer
$Q^2$: N, P
$R^{41}$, $R^{42}$ and $R^{43}$: alkyl group, cyclic hydrocarbon group; at least two of $R^{41}$ to $R^{43}$ may combine with each other to form a ring. These groups and rings may be substituted.
M: anion the same as defined for $X^1$ (4) Copolymer composed of (a), (b), and (c):

(a)

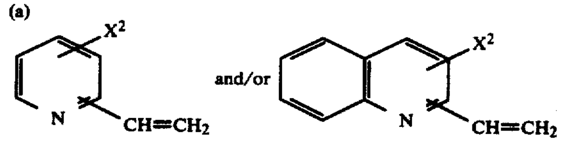

$X^2$: hydrogen atom, alkyl group, or halogen atom (the alkyl group may be substituted).

(b) acrylic acid ester (c) acrylonitrile.

(5) Water-insoluble polymer comprising more than $\frac{1}{3}$ of the repeating units shown by the following general formula:

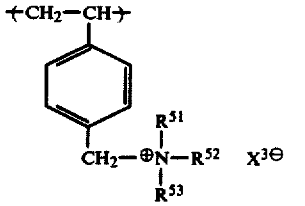

$R^{51}$, $R^{52}$ and $R^{53}$: each represents an alkyl group, the total carbon atom number of $R^{51}$ to $R^{53}$ being larger than 12 (the alkyl group may be substituted).

$X^3$: anion the same as defined for $X^1$.

As gelatin for the mordanting layer, various known gelatins can be used. For example, there are limed gelatin, acid-treated gelatin, etc., or the above-described gelatins chemically denatured by phthalation or sulfonylation. Also, if necessary, gelatin may be subjected to a desalting treatment.

The mixing ratio of the polymer mordant and gelatin and the coating amount of the mordant can be easily determined according to the amount of dye or dyes to be mordanted, the kind and composition of the polymer mordant, and further the image-forming step employed, but it is preferred that the mordant polymer/gelatin ratio be 20/80 to 80/20 by weight ratio and the coverage of the mordant polymer be 0.5 to 8 g/m².

Dye-fixing layer (II) may have a white reflecting layer. For example, a layer of gelatin having dispersed therein titanium dioxide may be formed on the mordanting layer on a transparent support as a white reflecting layer. The titanium dioxide layer forms a white opaque layer and when the transferred color image is viewed from the transparent support side, a reflection-type color image is obtained.

For transferring a dye from the light-sensitive layer to the dye-fixing layer, a dye transferring solvent can be used. As the dye transferring solvent, water or an aqueous basic solution containing sodium hydroxide, potassium hydroxide, an alkali metal salt, etc., can be used. Also, a low boiling point solvent such as methanol, N,N-dimethylformamide, acetone, diisobutyl ketone-,etc., or a mixture of the low boiling point solvent and water or an aqueous basic solution can be used. The dye transferring solvent may be used by a method of wetting the dye-fixing layer with the solvent or by a method of incorporating in the material as water or crystallization of microcapsules (melts upon heating) containing the solvent.

EXAMPLE 1

In 1,000 ml of water were dissolved 6.5 g of benzotriazole and 10 g of gelatin and the solution was stirred at 50° C. Then, a solution of 8.5 g of silver nitrate dissolved in 100 ml of water was added to the aforesaid solution over a period of 2 minutes.

Then, a solution of 1.2 g of potassium bromide dissolved in 50 ml of water was added to the foregoing solution over a period of 2 minutes. By adjusting the pH of the resultant solution, excessive salts were precipitated and removed. Thereafter, the pH of the silver halide emulsion thus formed was adjusted to 6.0. The amount of the emulsion was 200 g.

A method of preparing a gelatin dispersion of the dye-providing material is explained below.

To 20 ml of cyclohexane were added 5 g of the dye-providing material which is shown by formula II-9, 0.5 g of succinic acid-2-ethyl-hexyl ester sodium sulfonate, 10 g of tricresyl phosphate and the mixture was heated to about 60° C. to form a homogeneous solution. The solution was mixed with 100 g of a 10% aqueous solution of gelatin with stirring and then the mixture was treated by means of a homogenizer for 10 minutes at 10,000 r.p.m. to form a dispersion. The dispersion is referred to as a dispersion of dye-providing material.

A photosensitive coating composition was prepared as follows:

(a) Silver benzotriazole emulsion containing photosensitive silver bromide: 10 g (b) Dispersion of dye-providing material: 3.5 g (c) Solution of 0.25 g of guanidine trichloroacetate dissolved in 2 ml of ethanol (d) 5% Aqueous solution of

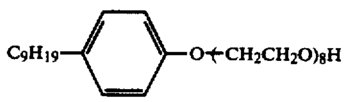

Foregoing components (a) to (d) were mixed with 2 ml of water followed by heating to form a solution and the solution thus prepared was coated on a polyethylene terephthalate film at a wet thickness of 60 μm. After drying, the coated sample was imagewise exposed using a tungsten lamp for 10 sec. at 2,000 lux. Thereafter, the sample was uniformly heated on a heat block heated to 130° C. for 30 sec.

A method of preparing a dye-fixing material having a dye-fixing layer is explained below.

In 200 ml of water was dissolved 10 g of a methyl acrylate-N,N,N-trimethyl-N-vinylbenzylammonium chloride copolymer (the mole ratio of methyl acrylate and vinylbenzylammonium chloride was 1:1) and the solution was uniformly mixed with 100 g of a 10% aqueous solution of limed gelatin. The mixture was uniformly coated on a polyethylene terephthalate film at a wet thickness of 20 μm and then dried to provide a dye-fixing material.

The dye-fixing material was wet with water and superposed on the foregoing heat treated light-sensitive material so that the coated layers of both materials faced each other. After 30 sec., the dye-fixing material was separated from the light-sensitive material, whereby a positive magenta color image was obtained on the dye-fixing material.

The density of the positive image was measured using a Macbeth transmission densitometer, the maximum density was 1.78 and the minimum density was 0.64 as the densities to green light. Also, in the gradation of the sensitometry curve, the density difference to the exposure difference of 10 times was 1.25 at the straight portion.

EXAMPLE 2

The same procedure as Example 1 was performed except that 0.4 g of 1-phenyl-4-methyl-4-oxymethyl-3-pyrazolidone was added to the photosensitive coating composition in Example 1 as an electron transfer agent. The maximum density of the magenta color image obtained was 1.8 and the minimum density thereof was 0.36.

EXAMPLE 3

The same procedure as Example 1 was performed except that dye-providing material (23) was used in place of dye-providing material used in Example 1. Thus, a yellow positive image having a maximum density of 1.62 and a minimum density of 0.73 was obtained.

While the invention has been described in detail and with reference to specific embodiments thereof, it will be apparent to one skilled in the art that various changes and modifications can be made therein without departing from the spirit and scope thereof.

What is claimed is:

1. A process for imagewise forming a mobile dye, which comprises heating, after or simultaneously with image exposure, a light-sensitive material having on a support a photosensitive silver halide, a binder, and an immobile dye-providing material which releases a dye by heating, and which is reductive and by heating becomes a material not releasing a dye by causing an oxidation reaction with the photosensitive silver halide at a portion where a silver halide is reduced to form silver.

2. A process as claimed in claim 1, wherein the light-sensitive material contains an organic silver salt oxidizing agent.

3. A process as claimed in claim 1, wherein the light-sensitive material contains a dye-releasing activator.

4. A process as claimed in claim 1, wherein the dye moiety of the immobile material is derived from a hydrophilic azo dye, azomethine dye, anthraquinone dye, naphthoquinone dye, styryl dye, nitro dye, quinoline dye, carbonyl dye, phthalocyanaine dye or metal complex salts thereof.

5. A process as claimed in claim 3, wherein the dye-releasing activator is a base or a base-releasing agent.

6. A process as claimed in claim 2, wherein the organic silver salt oxidizing agent is a silver salt of a carboxylic acid derivative or a nitrogen-containing heterocyclic compound.

7. A process as claimed in claim 1, wherein the binder is gelatin or a gelatin derivative.

8. A process as claimed in claim 1, wherein heating is conducted at a temperature of not lower than 80° C.

9. A process as claimed in claim 1, wherein heating is conducted in a substantially water free state.

10. A process as claimed in claim 1, wherein said light-sensitive material contains a heat solvent.

11. A process as claimed in claim 1, wherein said immobile dye-providing material is a compound selected from the group consisting of compounds represented by general formula (IA), (IB) and II:

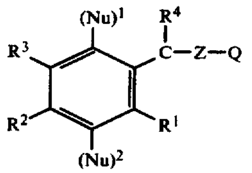

(IA)

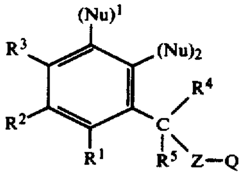

(IB)

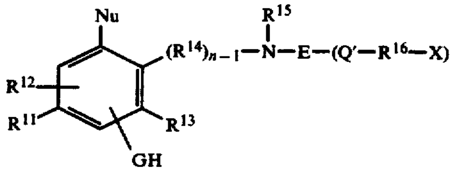

(II)

wherein $(Nu)^1$ and $(Nu)^2$ each represents a nucleophilic group; Z represents a divalent atomic group which is electrically negative to the carbon atom to which $R^4$ and $R^5$ are substituted; Q represents a dye moiety; $R^1$, $R^2$ and $R^3$ each represents a hydrogen atom, a halogen atom, an alkyl group, an alkoxy group, or an acylamino group; when said $R^1$ and $R^2$ are in an adjacent position to each other on the ring, they may form a condensed ring with the residue of the molecule; said $R^2$ and $R^3$ may form a condensed ring with the residue of the molecule; and $R^4$ and $R^5$, which may be the same or different, each represents a hydrogen atom, a hydrocarbon group, or a substituted hydrocarbon group; Nu represents a nucleophilic group; GH represents an oxidizable group, said GH may be a cyclic group formed together with $R^{11}$ and $R^{13}$ or a nucleophilic group; E represents an electrophilic group; Q' represents a group providing a monoatomic bonding between E and $R^{16}$, wherein the monoatom is a nonmetallic atom belonging to group Va or VIa of the periodic table in a -2 or -3 valence state, wherein said atom provides two covalent bonds for bonding E to $R^{16}$ and when Q' is a trivalent atom, it is substituted with a hydrogen atom, an alkyl group or an aromatic group, or Q' is an atomic group necessary for forming a 5- to 7-membered ring together with $R^{16}$; $R^{14}$ represents an alkylene group having 1 to 3 carbon atoms which group may be substituted with an alkyl group, an aryl group or an oxo group, or an alkylene group of which at least one methylene group is substituted with alkyl or aryl group; n is 1 or 2; $R^{16}$ represents an aromatic group having at least 5 carbon atoms, an aliphatic hydrocarbon group; $R^{15}$ represents an alkyl group, an aryl group, and said $R^{15}$ group may function as a ballast group; $R^{11}$, $R^{12}$ and $R^{13}$ each represents a hydrogen atom, a monoatomic substituent, a polyatomic substituent selected from the group consisting of an alkyl group having an alkoxy group, an aryl group, an alkyl carbonyl group, an aryl carbonyl group, a sulfamoyl group, and a sulfonamido group; said $R^{11}$ and $R^{12}$ are the polyatomic substituent when $R^{16}$ is an aliphatic hydrocarbon group, $R^{14}$ is selected to provide a substantial proximity of the nucleophilic group to E to permit the occurrence of an intramolecular nucleophilic reaction accompanied by the release of Q from E, wherein X represents a dye moiety and E is an electrophilic group which is able to undergo the intramolecular nucleophilic replacement reaction with the nucleophilic group.

12. An image-forming process which comprises heating, after or simultaneously with image exposure, a light-sensitive material having on a support a photosensitive silver halide, a binder, and an immobile dye-providing material which releases a hydrophilic dye by heating, and which is reductive and by heating becomes a material not releasing a dye by causing an oxidation reaction with the photosensitive silver halide at a portion where a silver halide is reduced to form imagewise a mobile dye and transferring the mobile dye to a dye-fixing layer to form a color image.

13. A process as claimed in claim 12, wherein the dye-fixing layer contains a dye-releasing activator.

14. A process as claimed in claim 12, wherein the mobile dye released is transferred to the dye-fixing layer using water or an aqueous basic solution.

15. A process as claimed in claim 14, wherein a dye mordant is used for the dye-fixing layer.

16. A process as claimed in claim 12, wherein the dye-fixing layer is formed on a support other than the support having thereon the photosensitive silver halide material.

17. A process as claimed in claim 12, wherein the dye-fixing layer is formed in the light-sensitive material.

18. A process as claimed in claim 11, wherein E in formula (II) is a carbonyl group or a thiocarbonyl group.

* * * * *